US012464150B2

(12) United States Patent
Gudumasu et al.

(10) Patent No.: US 12,464,150 B2
(45) Date of Patent: Nov. 4, 2025

(54) METHODS AND APPARATUS FOR PERFORMING REAL-TIME VVC DECODING

(71) Applicant: INTERDIGITAL VC HOLDINGS, INC., Wilmington, DE (US)

(72) Inventors: Srinivas Gudumasu, San Diego, CA (US); Saurav Bandyopadhyay, San Diego, CA (US); Yuwen He, San Diego, CA (US); Yong He, San Diego, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 558 days.

(21) Appl. No.: 17/779,212

(22) PCT Filed: Nov. 24, 2020

(86) PCT No.: PCT/US2020/061909
§ 371 (c)(1),
(2) Date: May 24, 2022

(87) PCT Pub. No.: WO2021/108341
PCT Pub. Date: Jun. 3, 2021

(65) Prior Publication Data
US 2023/0007283 A1 Jan. 5, 2023

Related U.S. Application Data

(60) Provisional application No. 62/939,858, filed on Nov. 25, 2019.

(51) Int. Cl.
*H04N 19/436* (2014.01)
*H04N 19/124* (2014.01)
(Continued)

(52) U.S. Cl.
CPC ......... *H04N 19/436* (2014.11); *H04N 19/124* (2014.11); *H04N 19/139* (2014.11);
(Continued)

(58) Field of Classification Search
CPC .... H04N 19/176; H04N 19/105; H04N 19/70; H04N 19/436; H04N 19/186;
(Continued)

(56) References Cited

U.S. PATENT DOCUMENTS

2008/0165864 A1  7/2008  Eleftheriadis et al.
2012/0250772 A1  10/2012  Gao et al.
(Continued)

FOREIGN PATENT DOCUMENTS

CN    103124345    5/2013
CN    104038766    9/2014
(Continued)

OTHER PUBLICATIONS

Chen et al. (Title: Algorithm description for Versatile Video Coding and Test Model 6 (VTM 6), Joint Video Experts Team (JVET) of ITU-T SG 16 WP 3 and ISO/IEC JTC 1/SC 29/WG 11 15th Meeting: Gothenburg, SE, Jul. 3-12, 2019) (Year: 2019).*

(Continued)

*Primary Examiner* — Masum Billah
(74) *Attorney, Agent, or Firm* — Ronald Kolczynski

(57) ABSTRACT

Apparatus and methods for implementing a real-time Versatile Video Coding (VVC) decoder use multiple threads to address the limitation with existing parallelization techniques and fully utilizes the available CPU computation resource without compromising on the coding efficiency. The proposed Multi-threaded (MT) framework uses CTU level parallel processing techniques without compromising on the memory bandwidth. Picture level parallel processing separates the sequence into temporal levels by considering (Continued)

the picture's referencing hierarchy. Embodiments are provided using various optimization techniques to achieve real-time VVC decoding on heterogenous platforms with multi-core CPUs, for those bitstreams generated using a VVC reference encoder with a default configuration.

9 Claims, 20 Drawing Sheets

(51) Int. Cl.
    *H04N 19/139*    (2014.01)
    *H04N 19/159*    (2014.01)
    *H04N 19/176*    (2014.01)
    *H04N 19/52*     (2014.01)
    *H04N 19/593*    (2014.01)
    *H04N 19/82*     (2014.01)
    *H04N 19/96*     (2014.01)

(52) U.S. Cl.
    CPC ......... *H04N 19/159* (2014.11); *H04N 19/176* (2014.11); *H04N 19/52* (2014.11); *H04N 19/593* (2014.11); *H04N 19/82* (2014.11); *H04N 19/96* (2014.11)

(58) Field of Classification Search
    CPC .... H04N 19/52; H04N 19/124; H04N 19/159; H04N 19/577; H04N 19/132; H04N 23/62; H04N 23/63; H04N 23/631; H04N 23/633; G06T 11/00; G06T 11/60; G06T 13/60; G06T 19/006; G06T 2200/24
    USPC ........................................................ 375/240
    See application file for complete search history.

(56) References Cited

U.S. PATENT DOCUMENTS

| | | |
|---|---|---|
| 2014/0153635 A1 | 6/2014 | Zhang et al. |
| 2018/0124399 A1 | 5/2018 | Su |

FOREIGN PATENT DOCUMENTS

| | | |
|---|---|---|
| CN | 105992008 | 10/2016 |
| CN | 111314777 | 6/2020 |
| JP | 2007219577 | 8/2007 |
| WO | 2016057817 | 4/2016 |

OTHER PUBLICATIONS

Chen et al., CE4-Related: Modified History-Based MVP to Support Parallel Processing, Document JVET-I0106, Joint Video Experts Team (JVET) of ITU-T SG 16 WP 3 and ISO/IEC JTC 1/SC 29/WG 11, 12th Meeting, Macao, CN, Oct. 3-12, 2018.
Zhou et al., AHG4: Enable Parallel Decoding With Tiles, Document: JCTVC-I0118 M24357, Joint Collaborative Team on Video Coding (JCT-VC) of ITU-T SG16 WP3 and ISO/IEC JTC1/SC29/WG11 9th Meeting: Geneva, Switzerland, Apr. 27-May 7, 2012.
ITU-T Recommendation H.264, "Series H: Audiovisual and Multimedia Systems Infrastructure of audiovisual services—Coding of moving video, Advanced video coding for generic audiovisual services", Telecommunication Standardization Sector of ITU, Nov. 2007, 564 pages.
Chen et al., "Algorithm description for Versatile Video Coding and Test Model 6 (VTM 6)", Joint Video Experts Team (JVET) of ITU-T SG 16 WP 3 and ISO/IEC JTC 1/SC 29/WG 11, Document: JVET-O2002-v2, 15th Meeting: Gothenburg, Sweden, Jul. 3, 2019, 87 pages.
Bross, et al., "High Efficiency Video Coding (HEVC) Text Specification Draft 10 (for FDIS and Last Call)". Joint Collaborative Team on Video Coding (JCT-VC), Document No. JCTVC-L1003. Jan. 2013, 310 pages.
De Souza et al., GPU-Assisted HEVC Intra Decoder, J Real-Time Image Proc, (2016), vol. 12, pp. 531-547.
De Souza et al., HEVC In-Loop Filters GPU Parallelization in Embedded Systems, International Conference on Embedded Computer Systems: Architectures, Modeling, and Simulation (SAMOS XV), 2015, pp. 123-130.
De Souza et al., Cooperative CPU+GPU Deblocking Filter Parallelization For High Performance HEVC Video Codecs, 2014 IEEE International Conferencee on Acoustic, Speec and Signal Processing (IACASSP), pp. 4993-4997.
Alshina et al., "Known Tools Performance Investigation for Next Generation Video Coding", Document VCEG-AZ05, ITU-Telecommunication Standardization Sector, Study Group 16 Question 6, Video Coding Experts Group (VCEG), 52nd Meeting: Jun. 19-26, 2015, Warsaw, Poland.
Gudumasu et al., [AHG16] VVC Multi-Thread Decoder and Performance Analysis, Joint Video Experts Team (JVET) of ITU-T SG 16 WP3 and ISO/IEC JTC 1/SC 29/WG 11, 18th MeetingP: by Teleconference, Apr. 15-24, 2020, Document: JVET-R0390.
Zhang et al., Design and Implementation of Parallel Algorithms for Sample Adaptive Offset in HEVC Based on GPU, Sixth International Conference on Information Science and Technology Dalian, China, May 6-8, 2016, pp. 181-187.
Segall et al., "Joint Call for Proposals on Video Compression with Capability beyond HEVC", Joint Video Exploration Team (JVET) of ITU-T SG 16 WP 3 and ISO/IEC JTC 1/SC 29/WG 11, Doc. JVET-H1002 (v6), 8th Meeting: Macao, CN, Oct. 18-24, 2017, 27 pages.
Chen, Jianle, et al., "Coding Tools Investigation for Next Generation Video Coding Based on HEVC". Applications of Digital Image Processing XXXVIII, vol. 9599, International Society for Optics and Photonics, (2015), pp. 95991B-1 to 95991B-9.
VC-1 Compressed Video Bitstream Format and Decoding Process— Amendment 2, SMPTE Standard, Amendment 2:2011 to SMPTE ST 421M:2006, pp. 1-5.
Introduction to Information Communication, First Edition, Corona Publishing Co., Ltd., Oct. 26, 2016, pp. 39 to 44, ISBN: 978-4-339-02857-7, Edited by Takao Waho.
H.265/HEVC Textbook, First Edition, Oct. 21, 2013, Impress Japan Co., Ltd., pp. 146 to 148, ISBN: 978-4-8443-3468-2, Edited by Sakae Okubo.
Hamidouche et al., Parallel SHVC Decoder: Implementation and Analysis, Proceedings of 2014 IEEE International Conference on Multimedia and Expo (ICME), IEEE, Sep. 8, 2014, 6 pages, ISBN: 978-1-4799-4761-4.
Gudumasu, et al. Real-time SHVC Software Decoding with Multi-threaded Parallel Processing , Proceedings of SPIE , SPIE , vol. 9217, pp. 92171R-1 to 92171R-14 , ISSN: 0277-786X, (abstract).
Chi, et al., Parallel Scalability and Efficiency of HEVC Parallelization Approaches, IEEE Transactions on Circuits and Systems for Video Technology, IEEE, Dec. 9, 2012, vol. 22, No. 12, pp. 1827-1838.

\* cited by examiner

METHODS AND APPARATUS FOR PERFORMING REAL-TIME VVC DECODING

TECHNICAL FIELD

At least one of the present embodiments generally relates to a method or an apparatus for video decoding or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for performing real time decoding, as in the VVC (Versatile Video Coding or H.266) standard.

According to a first aspect, there is provided a method. The method comprises steps for assigning threads for CABAC decoding of video frames using parallel processing, wherein a higher number of threads are assigned for decoding of frames with a low quantization parameter compared to a higher quantization parameter, or an intra frame relative to an inter frame, or for P frames, or when the frame is in a lower temporal layer; and, decoding said video frames using said assigned threads.

According to a second aspect, there is provided another method. The method comprises steps for generating motion vectors for a coding unit; performing inter coding unit reconstruction; performing intra coding unit reconstruction; and, performing inverse reshaping and in-loop filter of said video, wherein said generating and performing steps are performed concurrently on distinct portions of the video.

According to another aspect, there is provided an apparatus. The apparatus comprises a device, comprising: memory; and, one or more processors, configured to assign threads for CABAC decoding of video frames using parallel processing, wherein a higher number of threads are assigned for decoding of frames with a low quantization parameter compared to a higher quantization parameter, or an intra frame relative to an inter frame, or for P frames, or when the frame is in a lower temporal layer; and, decode said video frames using said assigned threads.

According to another aspect, there is provided another apparatus. The apparatus comprises a device, comprising: memory; and, one or more processors, configured to generate motion vectors for a coding unit; perform inter coding unit reconstruction; perform intra coding unit reconstruction; and, perform inverse reshaping and in-loop filter of said video, wherein the device is configured to said generate and perform concurrently on distinct portions of the video.

According to another general aspect of at least one embodiment, there is provided a device comprising an apparatus according to any of the decoding embodiments; and at least one of (i) an antenna configured to receive a signal, the signal including the video block and tensors of feature maps, (ii) a band limiter configured to limit the received signal to a band of frequencies that includes the video block, or (iii) a display configured to display an output representative of a video block or any receiving device analyzing features/decoded content.

According to another general aspect of at least one embodiment, there is provided a non-transitory computer readable medium containing data content decoded according to any of the described encoding embodiments or variants.

According to another general aspect of at least one embodiment, there is provided a signal comprising video data decoded according to according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard. Meanwhile, to facilitate the assessment of new coding tools, another reference software base called benchmark set (BMS) was also generated. In the BMS codebase, a list of additional coding tools which provides higher coding efficiency and moderate implementation complexity, are included on top of the VTM and used as the benchmark when evaluating similar coding technologies during the VVC standardization process. Specifically, besides JEM coding tools, e.g. 4×4 non-separable secondary transform (NSST), generalized bi-prediction (GBi), bi-directional optical flow (BIO), decoder-side motion vector refinement (DMVR) and current picture referencing (CPR) integrated in the BMS-2.0, it includes the trellis coded quantization tool.

Figure 1:
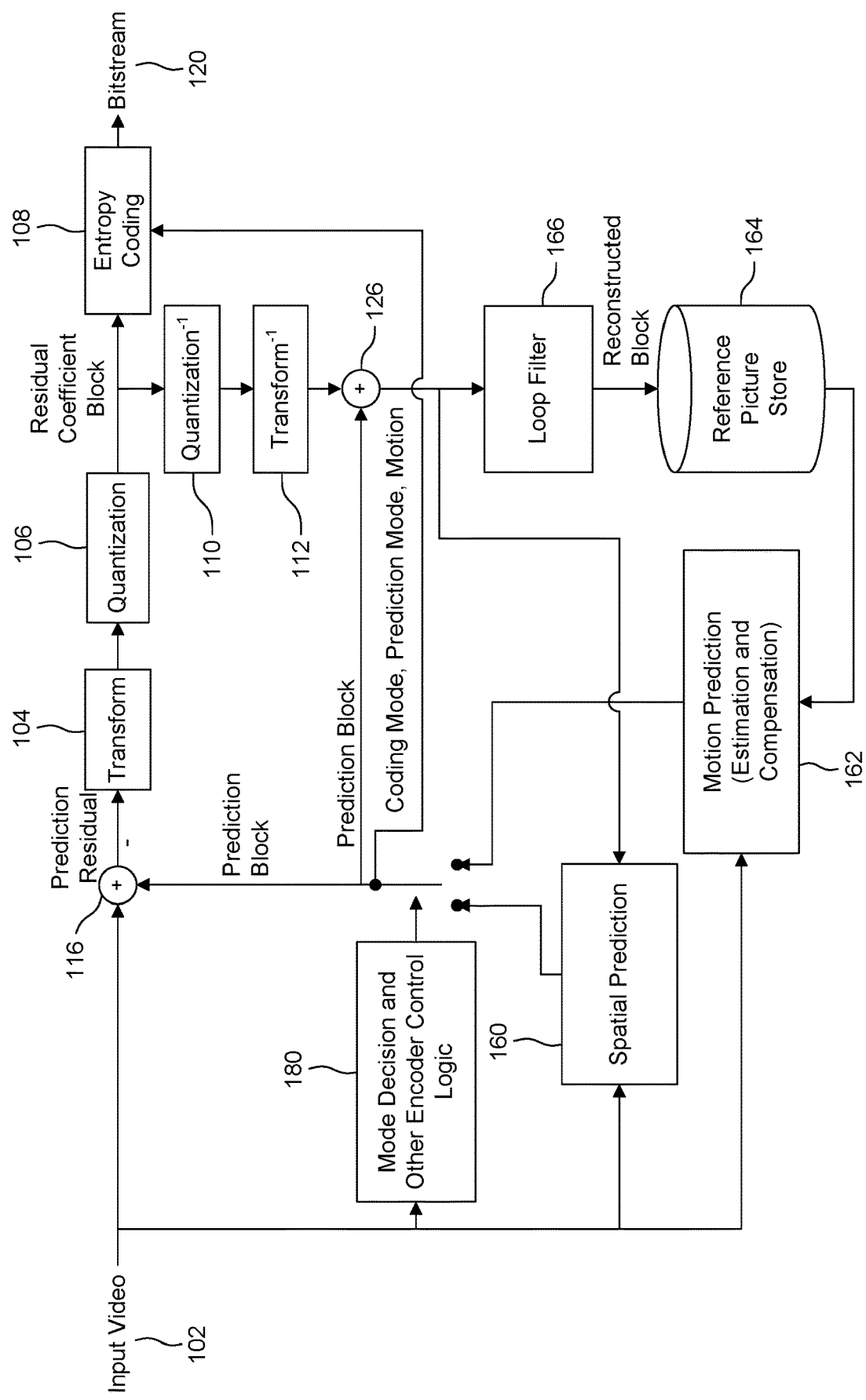
FIG. 1 illustrates a general diagram of block-based video encoder for VVC.
Figure 2:
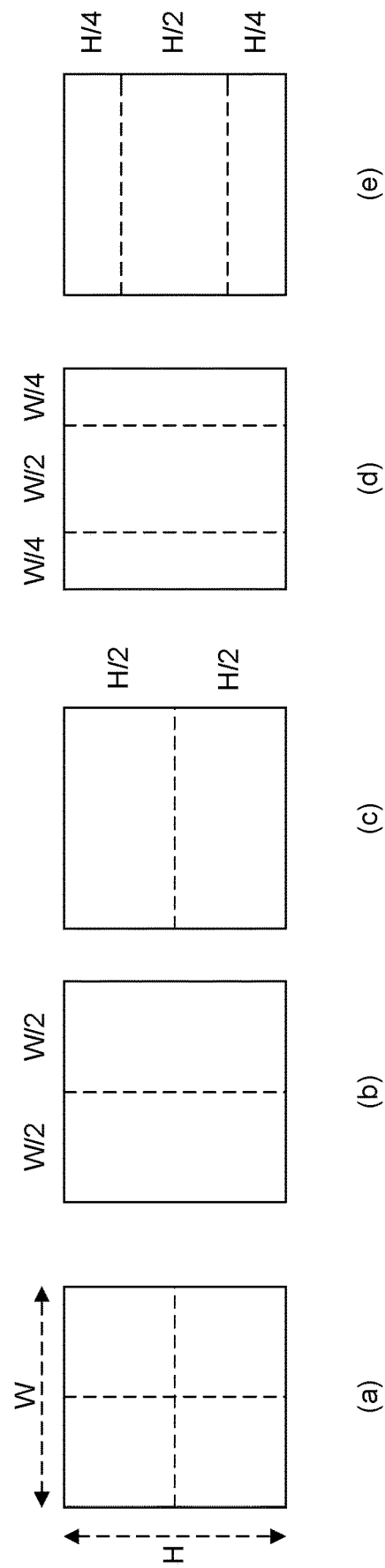
FIG. 2 illustrates block partitions in the multi-type tree structure: (a) quaternary partition; (b) vertical binary partition; (c) horizontal binary partition; (d) vertical ternary partition; (e) horizontal ternary partition.

Like HEVC, the VVC is built upon the block-based hybrid video coding framework. FIG. 1 gives the block diagram of a generic block-based hybrid video encoding system. The input video signal 102 is processed block by block (called coding units (CUs)). In VTM-1.0, a CU can be up to 128×128 pixels. However, different from the HEVC which partitions blocks only based on quad-trees, in the VTM-1.0, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIG. 2, there are five splitting types, quaternary partitioning, horizontal binary partitioning, vertical binary partitioning, horizontal ternary partitioning, and vertical ternary partitioning. In FIG. 1, spatial prediction (160) and/or temporal prediction (162) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106). The quantized residual coefficients are inverse quantized (110) and inverse transformed (112) to form the reconstructed residual, which is then added back to the prediction block (126) to form the reconstructed signal of the CU. Further in-loop filtering, such as deblocking filter, sample adaptive offset (SAO) and adaptive in-loop filter (ALF) may be applied (166) on the reconstructed CU before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Amongst the inter prediction and in-loop filtering stages in VVC, the following tools are new compared to HEVC.
1) Combined Inter/Intra Prediction (CIIP)
2) Decoder side Motion Vector Refinement (DMVR)
3) Inverse reshaping CIIP mode combines inter prediction signal with intra prediction signal. The inter and intra prediction signals are combined using weighted averaging. The weights are based on the coding modes of the left and the top blocks.

In VVC, an additional flag is signalled per CU for combined inter/intra prediction (CIIP) mode if following conditions are satisfied.

When a CU is coded in merge mode
CU contains greater than 64 luma samples i.e. CU width times CU height is equal to or greater than 64
CU height and CU width are less than 128 luma samples VVC allows to increase MV accuracy using bilateral matching based motion vector refinement at the decoder, also known as decoder side motion vector refinement (DMVR). Template matching is performed at the decoder to refine the MV around the initial MV in the reference picture lists L0 and L1. The SAD is calculated between each refined MV candidate, within search range (25 point full search for integer samples) in raster scan order, around the initial MV. The MV candidate with the lowest SAD is used to generate the bi-predicted signal.

In VVC, DMVR can be applied for each CU that uses the following features.

CU level merge mode with bi-prediction MV
One reference picture is in the past and the other in future w.r.t. current picture
The POC (Picture Order Count) distance between both reference to the current picture are same
CU contains greater than 64 luma samples
Both CU height and CU width are larger than or equal to 8 luma samples
Bi-prediction with CU-level weight (BCW) weight index indicates equal weight
Weighted Prediction (WP) is not enabled for the current block Luma mapping with chroma scaling (LMCS) is added as a new tool in WC that can be enabled/disabled at the sequence level using a sequence parameter set (SPS) flag. LMCS is applied immediately before the loop filtering stage. For inter coded blocks, motion compensated prediction is applied in the mapped domain i.e. forward mapping function is applied to luma predicted blocks in the original domain to convert to mapped domain. For intra coded blocks, forward mapping is not applied.

LMCS consists of two parts i.e. 1. Luma mapping with piecewise linear models, 2. Luma dependent chroma scaling.

1. Luma mapping with piecewise linear models
    The luma mapping model is signalled at the tile group level. If the luma mapping model present flag is detected for current tile group, the corresponding piecewise linear model parameters are signalled. The signalled codewords are used to calculate the scaling factors and adjust the mapping function for each of the 16 equal pieces.
2. Luma dependent chroma residual scaling
    The chroma residual scaling is also signalled at the tile group level. If luma mapping is enabled and if dual tree partition is not applied to current tile group, an additional flag is signalled to indicate usage of luma dependent chroma residual scaling. Luma dependent chroma residual scaling is disabled for chroma blocks whose area is less than or equal to 4. The purpose of using chroma residual scaling is to compensate for the interaction between the luma and the chroma signals.

Figure 3:
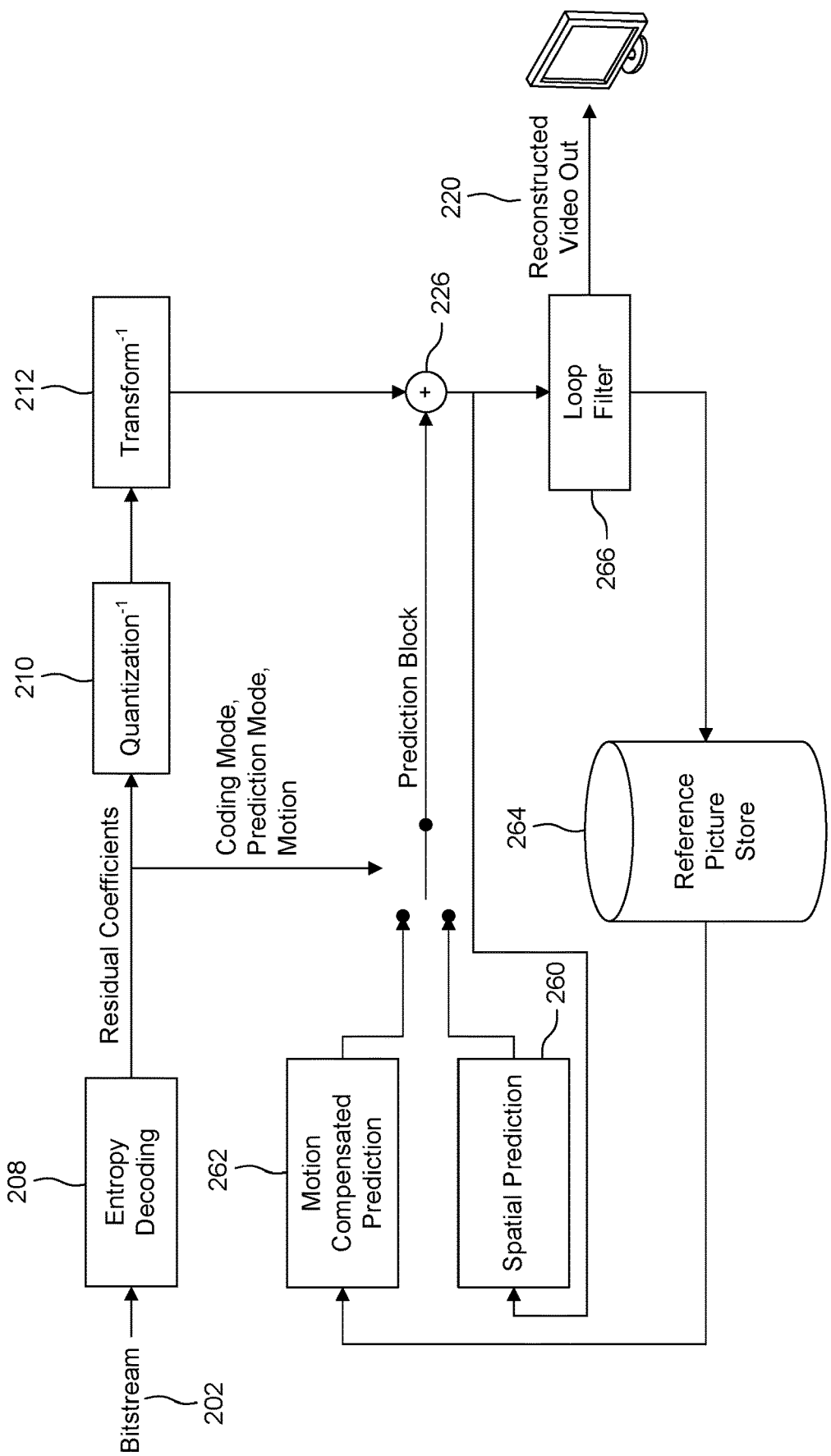
FIG. 3 illustrates a general block diagram of a video decoder for VVC.

FIG. 3 shows a general block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

Several published articles have exploited the parallelization capability of the video codecs prior to VVC on CPU, GPU or heterogenous platform. Another approach proposed an HEVC de-blocking filter that exploits independent regions of the frame and reduces the overall memory access. In other approaches, a GPU is used to accelerate HEVC decoding stages of de-quantization, inverse transform, intra prediction, deblocking filter and SAO. In another approach, a GPU based parallel algorithm is proposed including parallel computation of sample classification, statistics collection for each coding tree block, parallel computation of best offset values and minimum distortion for each class of edge offset and band offset, SAO merging and SAO filtering.

Frame-level parallelism consist of processing multiple frames at the same time while satisfying the motion compensation dependencies. One of the major limitations of the frame level parallelism is that the level of parallelism is determined by the length of the motion vector. This is a major bottleneck, especially for sequences with large motion. Slice level parallelism allow independently processing the slices from one another. The major drawback of this level of parallelism is that the number of slices is determined by the encoder. Moreover, in most cases, the codec may be limited to use one slice per frame resulting in almost no slice level parallelism. Additionally, slices reduce the coding efficiency.

The above shortcomings of the frame level or slice level parallelism can be overcome by employing Wavefront Parallel Processing (WPP) and Tiles. Both techniques allow subdivision of each picture into multiple partitions that can be processed in parallel. Each partition contains an integer number of coding units that must not have dependencies on other partitions. Usage of tiles reduces the coding efficiency and complicates the raster scan processing. However, the major drawback in tile usage is the rate-distortion loss that would be significant for higher number of tiles due to the lack of dependency between partitions.

Wavefront parallel processing (WPP) allow partitioning the picture without breaking the coding dependency or resetting the CABAC probabilities as in parallelism using Slices or Tiles. WPP method partitions one picture into CTU rows and allows prediction and entropy coding across the CTU row boundaries. For this reason, WPP results in lower loss of compression efficiency compared to Slices and Tiles parallel processing methods. However, the Wavefront dependencies doesn't allow all the CTB rows to simultaneously start decoding. Therefore, the rows don't finish the decoding at the same time either. This introduces parallelization inefficiencies that become more evident when a high number of WPP threads are used for decoding.

Overlapped Wavefront (OWF) Parallelism improves the implementation efficiency of WPP by overlapping the execution of consecutive pictures. The dependency in OWF technique is caused by motion search. In OWF, a CTU is not ready for decoding until all its reference pixels within the motion search area in the reference picture have been decoded. The motion search dependency limits the throughput of frame-level parallel processing threads for encoding multiple frames. This problem worsens when the center of the search window (decided by a motion predictor) is located toward the lower part of the reference pictures. On the other hand, restricting the motion vector leads to noticeable coding loss for videos that exhibit fast vertical motion.

Therefore, none of the parallelization techniques can fully utilizes the CPU processing capabilities available on today's multi-core systems.

The described embodiments address the limitation with existing parallelization techniques and fully utilizes the available CPU computation resource without compromising on the coding efficiency. The proposed Multi-threaded (MT) framework uses CTU level parallel processing techniques without compromising on the memory bandwidth. Picture level parallel processing separates the sequence into temporal levels by considering the picture's referencing hierarchy. This disclosure discusses various optimization techniques used to achieve real-time VVC decoding on heterogenous platforms with multi-core CPUs, for those bitstreams generated using VVC reference encoder with default configuration. Equivalent techniques proposed for the decoder could also be used with the VVC encoder framework.

The current VVC draft includes several aspects to make the coding process parallelizable. This includes Tiles and Wavefront Parallel Processing (WPP). Employing Tiles for parallelism introduces coding losses since there is no dependency among tiles. WPP divides slices into CTU rows and processes rows in parallel while preserving coding dependencies.

Figure 4:
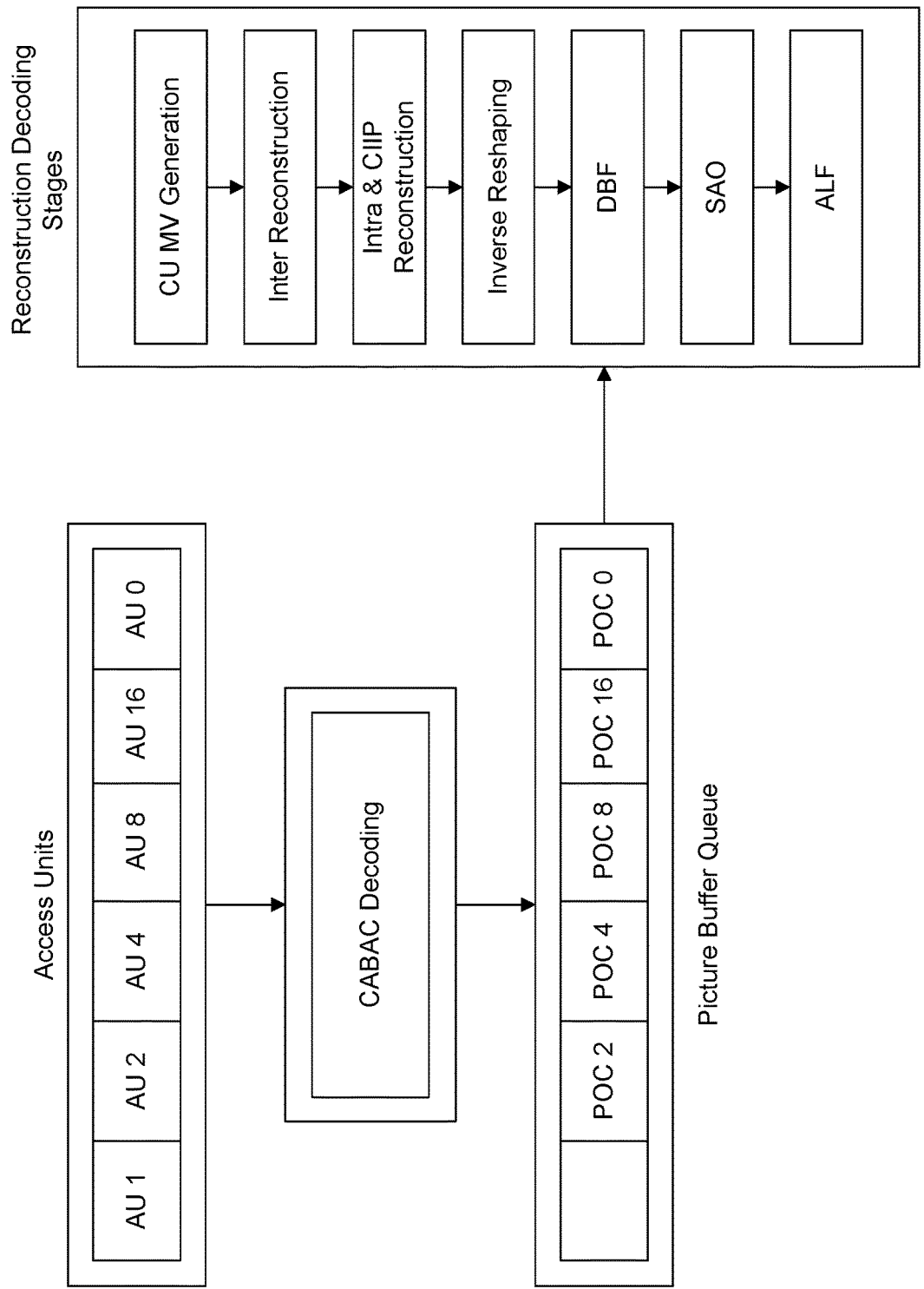
FIG. 4 illustrates an example overview of slice/picture decoding stages.

The current embodiments propose a finer granularity of parallelism without compromising on the coding efficiency. The section titled "Parallelization of CABAC with slice decoding stages" presents the finer granularity of the parallelism achieved by processing CABAC decoding and the rest of the slice decoding stages referred as reconstruction decoding stages. The architectural diagram of slice/picture decoding stages is shown in FIG. 4. Parallelization of each of the reconstruction decoding stages e.g. Inter, Intra, Re-shaper and In-loop filter as shown in FIG. 4 are described in the section titled "Parallelization of slice decoding stages".

In summary, the key contributions to improve the finer granularity parallelism of the pipeline multistage VVC decoder are as follows:
In the intra CU reconstruction stage all the disjoint/independent intra CTUs (CTU with all its intra coded CUs reference pixels coded in inter mode) can be reconstructed in parallel once their referenced pixels inter CU (left, top and top-right blocks) reconstruction process is completed;
Inter CU and the inter prediction of Combined Inter and Intra Prediction (CIIP) CU prediction process can be parallelized across all CTUs of a picture.
In order to balance the computational complexity, the WPP enabled CABAC decoding can be executed in parallel with the reconstruction decoding stages. The number of initially allocated threads for CABAC decoding of a picture varies dynamically based on the CABAC performance of the previous pictures;
Multiple stages of the decoder pipeline can be executed in parallel with in a picture and across temporal layer pictures. For example, CUMV, inter CU reconstruction and intra CU reconstruction decoding stages can be executed in parallel within a picture or across pictures;
Pre-analysis to find the location of first dependent CU in each CTU and utilize the information to improve Wavefront Parallel Processing (WPP) parallelization at CUMV and intra CU reconstruction stages;
In order to avoid scanning of the picture multiple times, de-blocking filter is parallelized by interleaving horizontal and vertical filtering stages. The number of horizontal and vertical edges within and between CTUs are calculated to evenly distribute the filtering workload among threads;
An additional condition is added to switch off DMVR adaptively. DMVR is used for merge candidates only when length of the motion vector is less than a predefined threshold. Disabling DMVR based on the length of motion vector leads to availability of reference areas and increases the DMVR parallelism.

The parallelization approaches for VVC decoding stages can be categorized into one of the following 3 categories. The category is selected for each decoding stage based on decoding dependency between CTUs. They are:
I. CTU level parallelization (CTUP);
II. Improved Overlapped Wavefront (IOWF) parallelization;
III. Load sharing based parallelization.

Approach I is chosen for VVC decoding stages without CTU level dependency, e.g. Re-shaping, Sample Adaptive Offset (SAO). Approach II is chosen for the VVC decoding stages that have CTU level dependency with intra CU prediction.

Approach I of our pipeline design adds fine granularity parallelism to the existing tile-based approach. It is based on flexible partitioning of the picture into CTUs such that dependencies between multiple CTU partition is prohibited. The number of CUs processed per threads is dynamically varied based on the QTBT partitioning.

Approach II of our pipeline design addresses the inefficiencies of Wavefront Parallel Processing (WPP) by following an Improved Overlapped Wavefront (IOWF) approach. IOWF proposed in these embodiments allow for overlapping the execution of consecutive pictures, regions e.g. CUs within CTUs of a picture and decoding stages within a picture using Wavefronts. The section titled "Parallelization of CABAC with slice decoding stages" below emphasizes on the pipeline design that is based on Approach II.

Approach III of our pipeline design parallelizes modules that are difficult to parallelize due to high branch divergence and low data parallelism. CABAC decoding falls under this category. Therefore, CABAC decoding is performed in parallel with the reconstruction decoding stages of the slice as explained in the section titled "Parallelization of CABAC with slice decoding stages".

Parallelization of CABAC with Slice Decoding Stages

Parallelization of CABAC with the slice decoding stages is based on proposed Approach III. One of the main reasons for VVC decoder latency is the data dependency for context selection of the CABAC engine. This is mainly because, content selection for a bin depends on the value of a previously decoded bin. This dependency is a bottleneck to achieve CABAC parallelism particularly at the decoder. This in turn adds to the decoder latency. This latency can be reduced if CABAC decoding of a picture is done in parallel with the reconstruction decoding stages of other pictures. Load balancing between CABAC and the reconstruction decoding stages consists of following stages.

I. Thread Priority Scheduling
The CABAC decoding complexity would dictate the thread execution priority. For example, CABAC decoding complexity of an intra slice is much higher compared to the other slices. So, intra slice CABAC decoding activity can be scheduled earlier than its previous picture in decoding order. Similarly, complexity of temporal layer 0 picture CABAC decoding is higher than temporal layer 1 etc. So next group of pictures (GOP) lower temporal layer picture(s) CABAC decoding can be scheduled in parallel with previous GOP higher temporal layer picture(s) CABAC decoding. This way, the fluctuation in CABAC decoding time can be balanced between temporal layer pictures. Thus, thread scheduling is prioritized based on following.

Early scheduling of CABAC decoding process for a picture based on the estimated complexity of that frame/slice.

II. Thread Allocation for WPP Enabled CABAC Decoding

Figure 5:
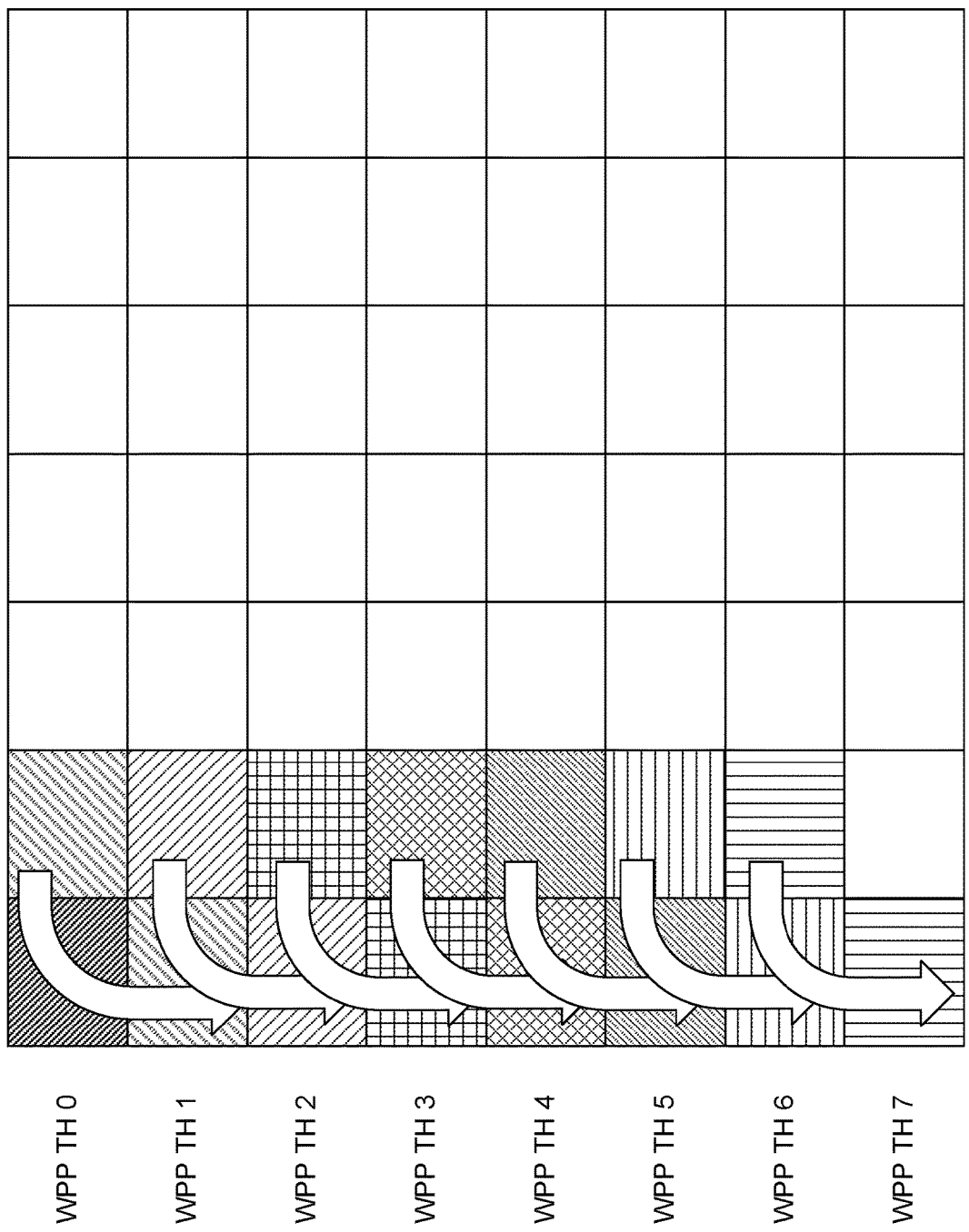
FIG. 5 illustrates an example of CABAC decoding with WPP parallelization.

As shown in FIG. 5, the initial number of threads allocated for WPP enabled CABAC decoding of a picture is dependent on frame decoding complexity. More threads are allocated for CABAC decoding if the frame decoding complexity is high e.g. for low QP, intra frame, inter pictures or lower temporal layers. Once number of threads are allocated for CABAC decoding, remaining available threads are allocated to process the reconstruction decoding stages of previous pictures. The total number of available threads is distributed between CABAC and the reconstruction decoding stages in the following manner.

Higher number of threads are assigned for CABAC decoding of frames with low QP compared to high QP, intra frame in comparison to inter frame, for P pictures or when the picture is in the lower temporal layer.

Higher number of threads are allocated for CABAC decoding for pictures with multiple tiles and slices in comparison to pictures with a single tile or single slice.

III. Dynamic Variation of Allocation

The number of initially allocated threads for WPP enabled CABAC decoding of a picture is varied dynamically based on the performance of the initial allocation. The wait time between CABAC and reconstruction decoding stages based on the initial allocation may be used as a thread allocation criterion. The goal of dynamic variation of number of threads allocated to CABAC and reconstruction decoding stages is to reduce per frame CABAC processing time fluctuation.

Number of threads allocated for CABAC decoding of the current frame is increased if time taken to process a similar previous frame is higher than the real-time constraints.

The number of threads allocated for CABAC decoding of the current frame is reduced if the wait time between CABAC decoding and reconstruction decoding stages is higher.

One of multiple previous frames could be used in deciding on dynamic variation of allocation.

Weight of the previous frames in deciding the dynamic assignment of threads for the current frame is varied based on POC distance, temporal layer & frame type Parallelization of Slice Decoding Stages The individual decoding stages after CABAC decoding are parallelized using Approaches I and II. The pipeline design follows the principal of overlapped execution of multiple decoding blocks that can be processed in parallel. If a thread has finished execution of a block, it will continue executing the next available block. The parallel processing partitions the picture into CTUs or CTU rows without affecting the dependencies. Such overlapped execution may occur within one decoder module or between modules. The sub-sections elaborate on this.

Thread Scheduling

Figure 6:
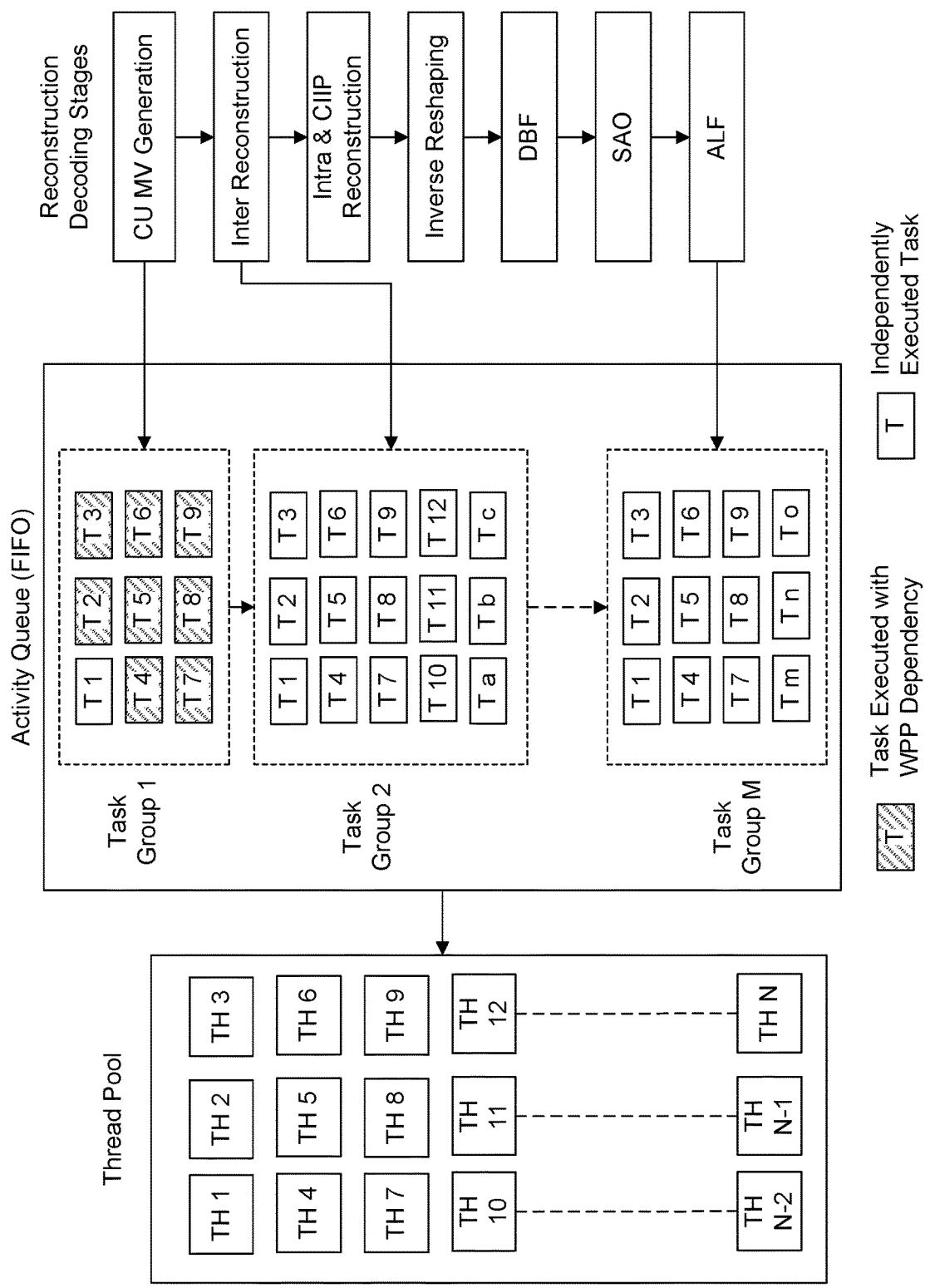
FIG. 6 illustrates an example thread scheduling mechanism for slice/picture reconstruction stages.

This section illustrates the thread scheduling mechanism shown in FIG. 6 for CUMV stage elaborated below in the section "CUMV generation". A thread pool and a first in first out (FIFO) activity queue is created for processing the reconstruction decoding stages activities. A thread pool is created based on the number of available CPU cores in the heterogeneous multi-core system. Any free thread from the thread pool fetches the first available task from the activity queue and executes the activity utilizing the CPU capabilities. Slice decoding thread pushes the list of tasks to be performed for decoding the slice/picture into activity queue. Slice decoding thread initially pushes CU motion vector generation of $1^{st}$ CTU row task with the dependency flag set to false and $2^{nd}$ CTU row task with dependency flag set to true until the last CTU row. A free worker thread referred as $1^{st}$ worker thread will fetch the first available activity from task queue and performs CU motion vector generation of the $1^{st}$ CTU and continues till the last CTU in the $1^{st}$ row without any dependency. Another free worker thread fetches the next activity from the queue ($2^{nd}$ CTU row CU motion vector generation) and process the activity in parallel with $1^{st}$ worker thread with WPP dependency. This process continues for all the slice/picture decoding stages.

GPU Parallel Processing

The parallelization schemes proposed in the sections titled "Parallelization within decoding stages" and "Parallelization between Decoding Stages" are appropriate for GPU parallelization scheme as well. The VVC decoding architecture is modified in order to reduce GPU memory usage e.g. global, cache or constant memory usage and to reduce GPU memory access. Instead of SIMD optimization used for CPU parallelization, GPU vector instruction is exploited to increase parallelization. Moreover, the GPU kernel launch is done immediately following file read operation. This removes the performance limitation due to memory transfers.

Parallelization within Decoding Stages

Current VVC design sequentially processes the decoding stages for each CTU. This design is not parallelization friendly. To improve the degree of parallelism of the VVC decoder stages, it is proposed to divide the decoding stages for each picture into the following sub-tasks.

Figure 7:
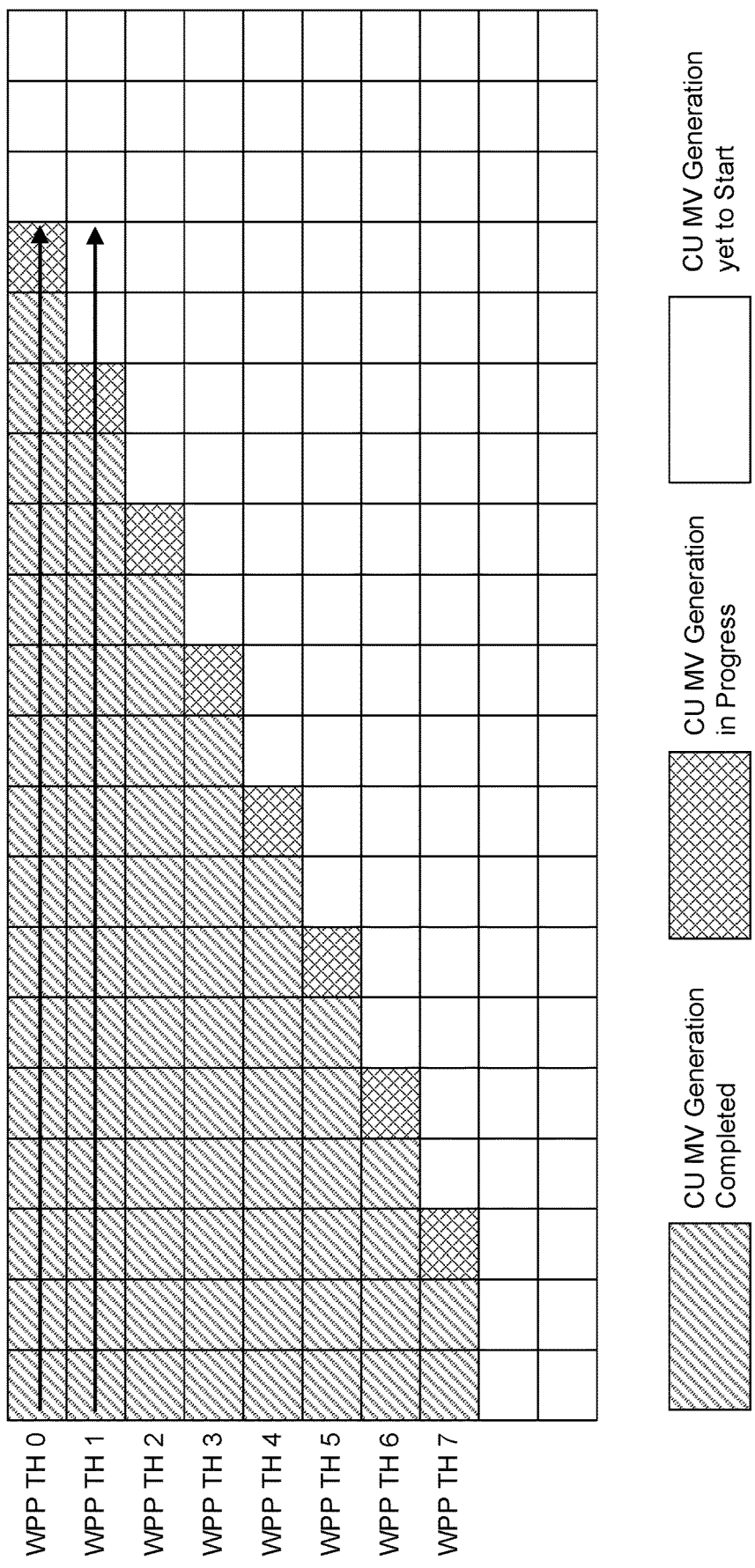
FIG. 7 illustrates coding unit motion vector generation with WPP parallelization.
Figure 8:
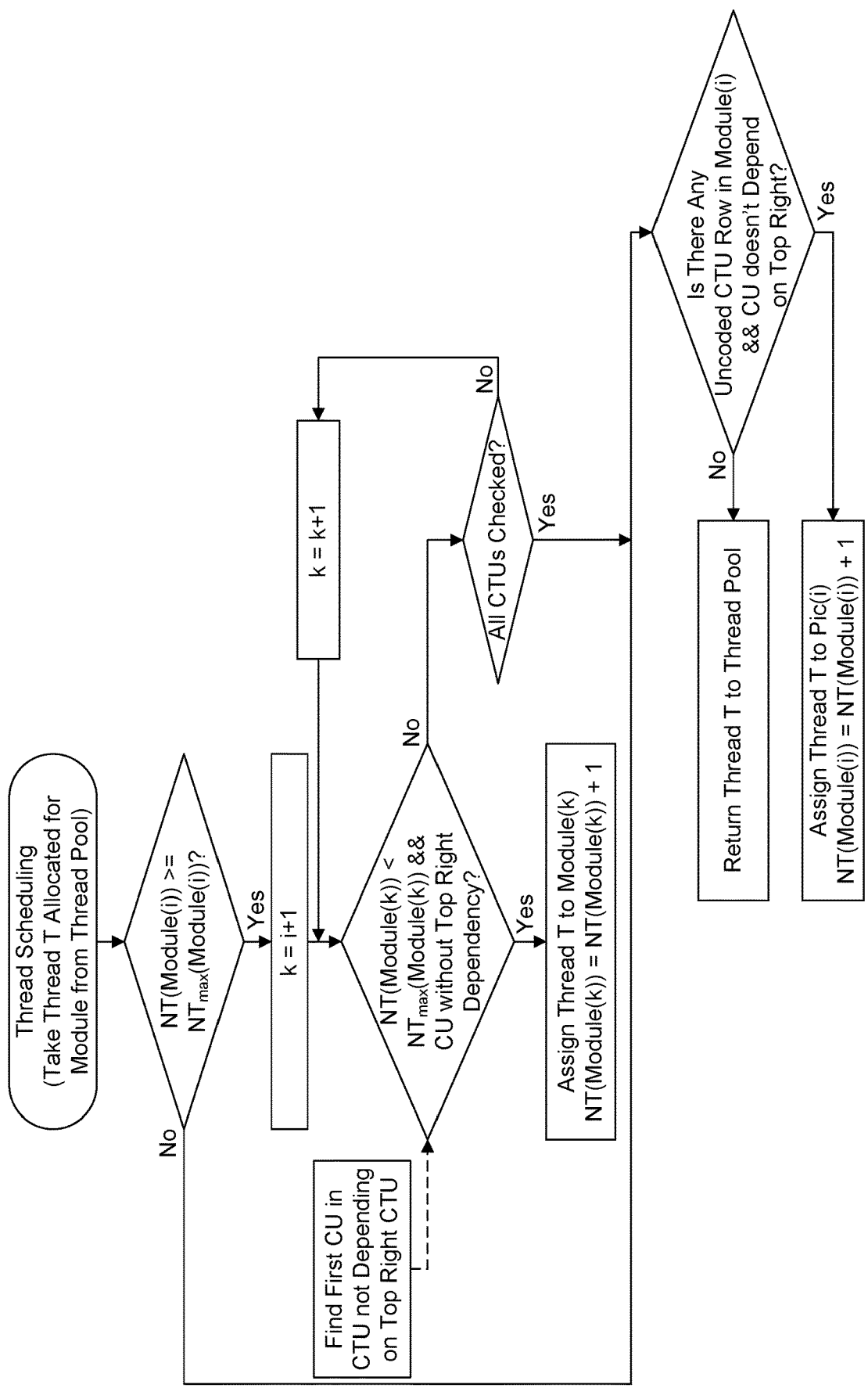
FIG. 8 illustrates an example parallelization within CUMV decoding stage.

1. CU motion vector (CUMV) generation
2. Inter CU reconstruction
   a. Combined inter intra Prediction (CIIP)
   b. Decoder Motion Vector Refinement (DMVR)
3. Intra CU reconstruction
4. Inverse reshaping
5. In-loop filtering
   a. De-blocking Filter
   b. Adaptive Loop Filter
   c. Sample Adaptive Offset CUMV Generation CU motion vector derivation process is completed for the entire inter slice/picture before proceeding to the reconstruction process. CU motion vector derivation can depend on its left, top and/or top right neighbor CU motion vector, which is referred as Wave front parallel processing (WPP) dependency. To achieve better parallel processing capabilities, each CTU row will be pushed to the activity queue in the order of increasing CTU number. As shown in FIG. 7, a free worker thread from the thread pool will fetch the first available CTU row from the activity queue and generates the motion vector of CTUs in sequential order until completion of the entire CTU row. Each worker thread makes sure that always the top right CTU has completed generating the motion vectors before proceeding to the current CTU motion vector generation. This way, a maximum of H (number of CTU rows) worker threads can be used for parallel processing of the entire picture motion vector generation. FIG. 8 illustrates the CUMV motion vector derivation process. The variables used in FIG. 8 are explained in Table 1.

TABLE 1

CUMV Variables definition

| Variables | Definitions |
|---|---|
| Module(i) | i-th block in CUMV motion derivation process |
| $NT_{max}$ | Maximum number of threads for CUMV module |
| NT | Number of threads allocated for CUMV module |

Figure 9:
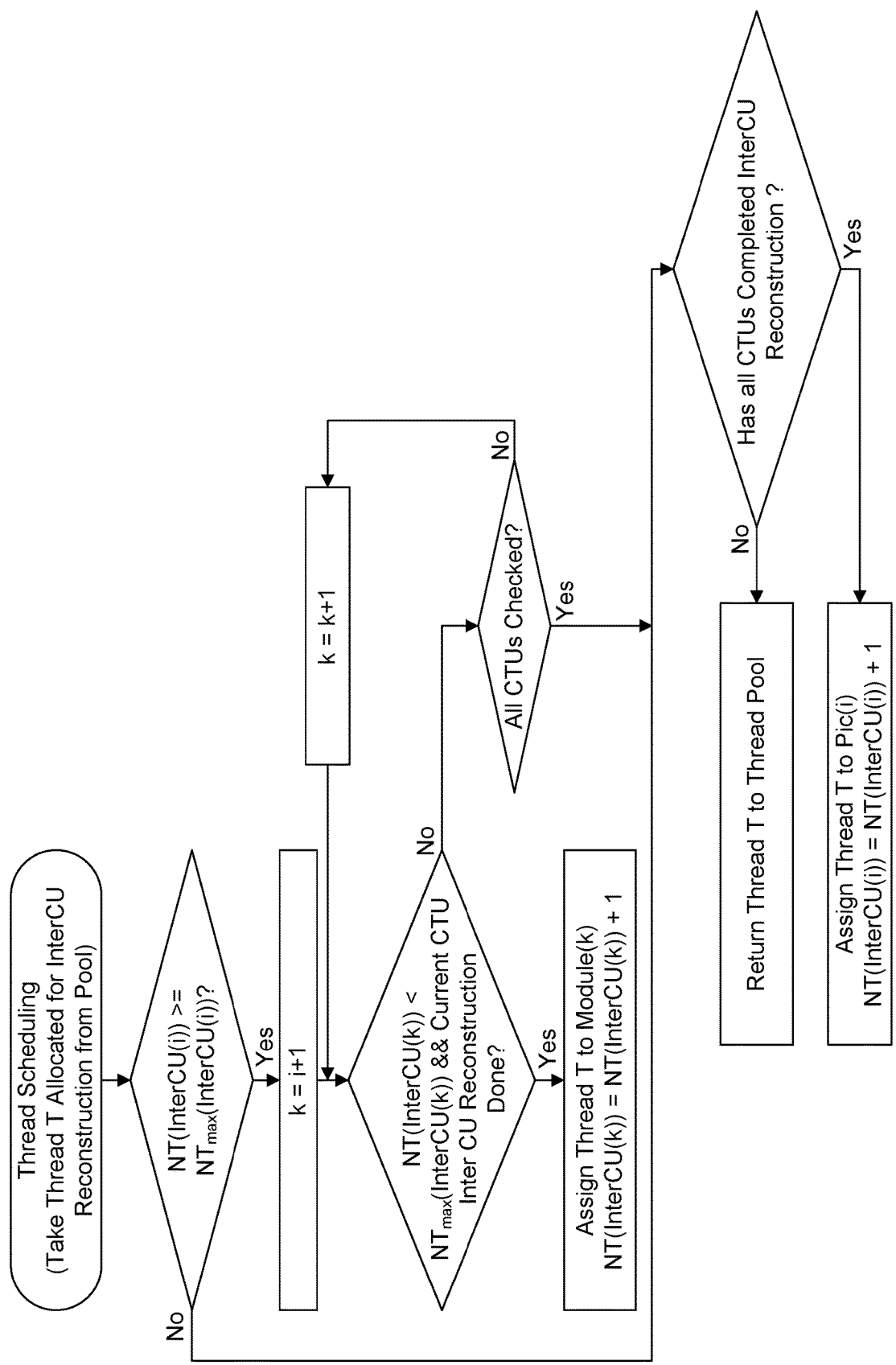
FIG. 9 illustrates parallelization within inter coding unit reconstruction decoding stage.

The steps used to derive the CUMV motion vectors can be summarized as follows.
- Pre-analysis to determine location of first CU in each CTU that depends on its top right CTU
- CUs till the location of the first CU in the current CTU, as in Step 1, can be processed in parallel with its top right CTU
- Remaining CUs of each CTU would require availability of the top right dependent CU but not the entire top right CTU Inter CU Reconstruction After CU motion vector derivation for the entire picture, inter CU reconstruction process has been separated from intra & CIIP mode reconstruction process. The inter CU reconstruction algorithm is elaborated in FIG. 9. The variables used in FIG. 9 are explained in Table 2.

TABLE 2

Inter CU reconstruction Variables definition

| Variables | Definitions |
|---|---|
| InterCU(i) | i-th interCU reconstruction decoding stage |
| $NT_{max}$ | Maximum number of threads for the module |
| NT | Number of threads currently working on module |

The rest of the decoding thread pushes the inter CU reconstruction process of a CTU or a group of CTUs to the activity queue in the increasing CTU number order. A free worker thread from the thread pool will fetch the first available CTU or CTU group from the activity queue and performs the inter CU reconstruction process of the entire CTU or CTU group (one after the other CTU). All the worker threads perform the inter CU reconstruction process of its CTU group in parallel utilizing multiple CPU/GPU cores available in the system. This way the complexity of the whole slice/picture inter CU reconstruction can be reduced drastically.

I. CIIP

When a CU is coded in merge mode with the number of luma samples greater than 64 and both CU width and CU height is less than or equal to 128 an additional flag signals the usage of combined inter/intra CU prediction (CIIP) mode. Since the combined inter with intra for the current CU, the inter prediction of the CIIP mode CU can be combined with other inter CU prediction process. Inter CU and CIIP inter CU prediction process can be parallelized across all CTUs of a picture. This way the CIIP inter CU reconstruction process time can be reduced significantly by processing them in parallel using multiple worker threads. CIIP intra CU reconstruction process is combined with other intra CUs reconstruction process.

II. DMVR

VVC allows to obtain refined motion vectors without transmission of refined motion vector and thus reduces the computation complexity of the encoder. However, in the process DMVR increases the computational workload and the processing time of the decoder. In DMVR, the computational complexity arises due to the search scheme around the search center, the metric used e.g. Sum of Absolute Difference (SAD) to choose the refinement and the bi-linear interpolation to interpolate fractional pixel positions.

As the size of the motion vectors (MV) are restricted in either the encoder or decoder, lesser number of reference areas would be necessary to calculate DMVR output for the current CU. Therefore, restricting the number of the search points or the size of the MV within a region would increase DMVR parallelism at the cost of describing fast motion.

DMVR can be switched on and off adaptively without signalling overhead. The MV refinement process operates only when the following conditions are satisfied.
- The coding unit is a merge mode
- Uni-directional, ATMVP, STMVP, affine and merge candidate using IC mode are excluded
- Only one of $(POC_{ref0}-POC_{cur})$ and $(POC_{ref1}-POC_{cur})$ values is negative In at least one of the described embodiments, an additional condition is added to only use DMVR when length of the motion vector is less than a pre-defined threshold. Disabling DMVR based on the length of motion vector lead to availability of reference areas and increase the DMVR parallelism for merge candidates that is bi predicted.

Intra CU Reconstruction

A traditional WPP parallelization of the intra CU prediction treat each CTU row as an independent region. On the CTU level, each CTU must wait until its left and top-right neighboring CTUs finish reconstruction. This process makes the current CTU row always two CTU latent than its adjacent upper row. To mitigate this issue, the general aspects described herein propose the following stages for intra CU prediction parallelization.

I. Pre-Analysis
- Pre-analysis stage determines the location of first dependent CU for each CTU that depends on top right CTU
- Find the number of disjoint CTUs in a picture. A disjoint CTU is one in which all its intra coded CUs reference pixels are coded in inter mode.

Figure 10:
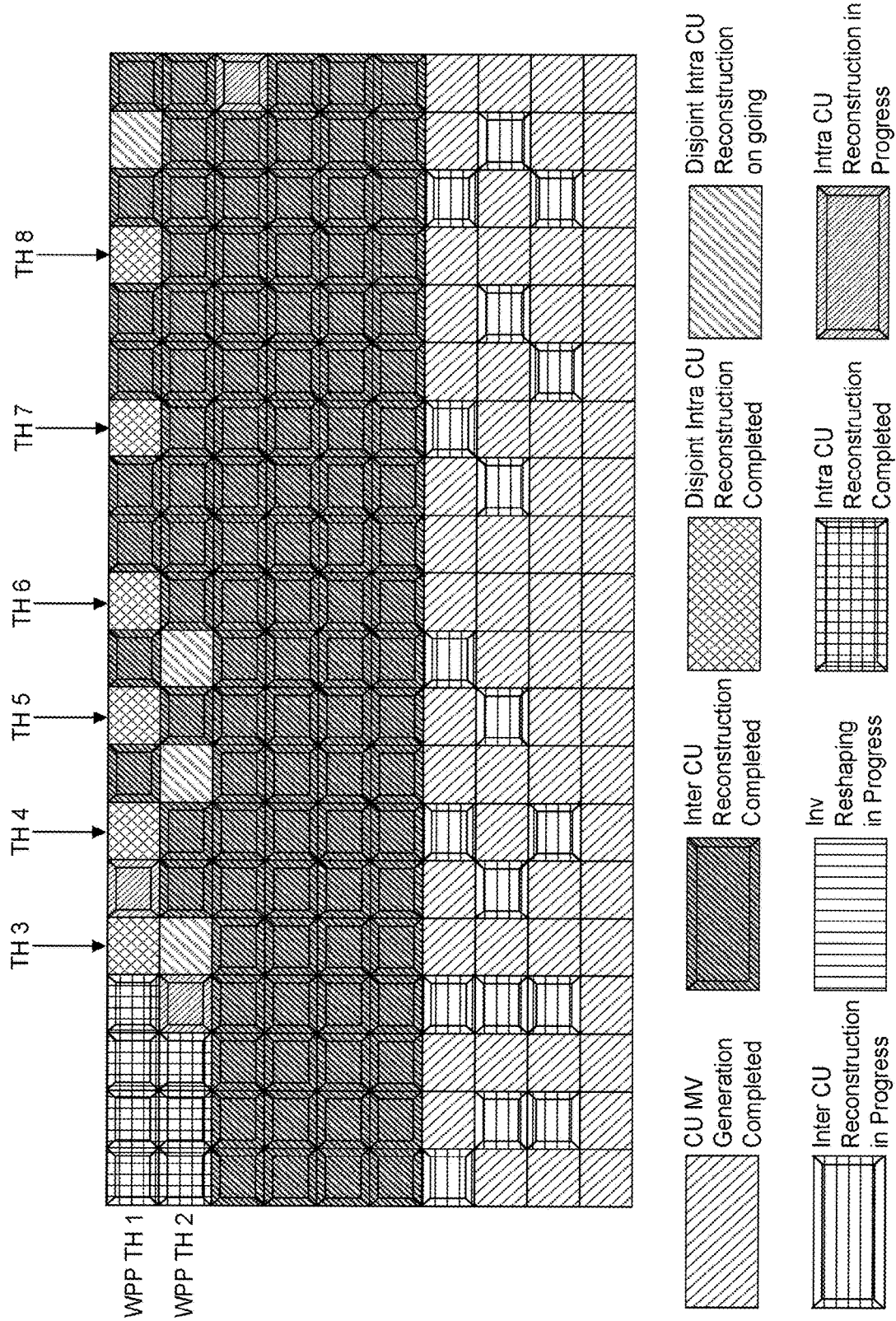
FIG. 10 illustrates an example of disjoint intra coding unit reconstruction in parallel.

II. Parallelization Scheme
- Based on the above pre-analysis results, CUs till the location of the first dependent CU in current CTU can be processed in parallel with its top right CTU
- All the disjoint intra CUs can be reconstructed in parallel once their referenced pixels inter CU (left, top and top-right blocks) reconstruction process is completed. A free worker thread can process a constant number of disjoint intra CUs. When more disjoint intra coded CUs are available, each free worker thread can process a constant number of disjoint CUs in parallel with other worker threads.
- Disjoint intra coded CTUs in the top rows will have higher priority. Each disjoint CTU in the top rows will be processed by a free worker thread. With this thread scheduling method, the top rows' intra CU reconstruction process can be completed faster and can reduce the wait time significantly for the next CTU rows. As shown in FIG. 10, each disjoint CTU in the first row is processed by a free worker thread after the inter CU reconstruction process completion of that CTU.

A WPP thread executes the 1$^{st}$ CTU row intra CU reconstruction process for the remaining CTUs in sequence. This WPP thread runs in parallel with the above disjoint CTUs reconstruction process.

De-Blocking Filter

The de-blocking is a module in the VVC loop-filtering stage immediately following the inverse re-shaper. In VVC, the vertical de-blocking filtering stage is based on the horizontally de-blocking filtered output. Therefore, current design sequentially processes the horizontal and vertical filtering stages. However, there is no data dependency between CTUs for either the horizontal or vertical filtering stages. Thus, all CTUs for the whole frame can be processed in parallel. The section "Interleaved grouping" below, proposes techniques to interleave the horizontal and the vertical filtering stages and to mitigate increased memory access due to CTU level parallelization.

IV. Edge Based CTU Grouping

In VVC, the maximum allowed CTU size is 128×128. Thus, for a de-blocking performed on a 8×8 grid the maximum number of permissible vertical edges are: 128/8=16. However, due to QTBTTT partitioning the number of vertical and horizontal edges may vary within and between CTUs. Therefore, in order to evenly distribute the processing load between threads it is processed to distribute the task per thread based on the number of pre-defined edges.

V. Region of Interest (ROI) Based CTU Grouping

Instead of grouping consecutive CTU rows for thread assignment, a region of interest (ROI) may be chosen for per thread processing. Grouping the CTUs for DBF processing based on Region of Interest would lead to better handling of memory.

VI. Interleaved Grouping

Figure 12:
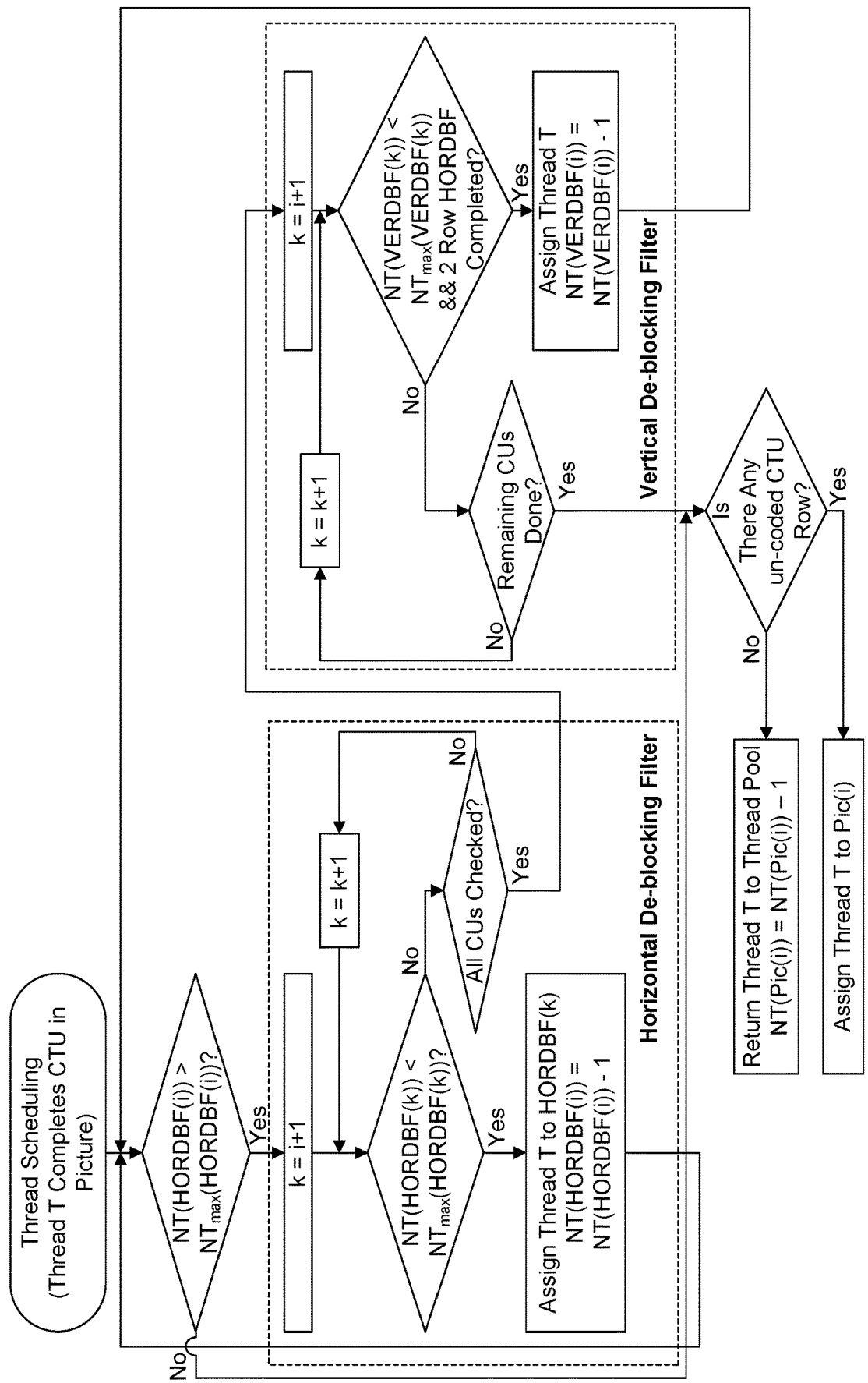
FIG. 12 illustrates interleaved processing of horizontal and vertical deblocking filter decoding stages.

Existing VVC design sequentially processes the horizontal and vertical filtering stages. This requires multiple scanning of the picture and increases memory access. Instead of sequentially processing the entire picture, it is proposed here to interleave the horizontal and vertical filtering stages. 2 CTU rows horizontal filtering is processed in the 1$^{st}$ pass followed by vertical filtering. This guarantees the availability of horizontally filtered pixels for the current CTU row and the below CTU row before vertical filtering of the current CTU row begins. FIG. 12 shows the joint parallelization of the horizontal and vertical deblocking stages. The variables used are explained in Table 3.

TABLE 3

Interleaved Horizontal & Vertical De-blocking Filter Variables definition

| Variables | Definitions |
|---|---|
| HORDBF(i) | i-th horizontal de-blocking filter decoding stage |
| VERDBF(i) | i-th vertical de-blocking filter decoding stage |
| NT$_{max}$ | Maximum number of threads for the module |
| NT | Number of threads currently working on module |

Parallelization Between Decoding Stages

The parallelization between decoding stages is based on Approach I. The data structures and dependencies between the video coding stages limits the possibility of parallelism within and between stages. For example, decoding modules such as CABAC has high branch divergence and low data parallelism. Likewise, modules such as loop-filtering with low branch divergence and higher data parallelism are good candidates for parallel processing. Proposed parallelization techniques perform such analysis of the VVC decoder based on the criteria of branch divergence and data parallelism to determine the effectiveness of parallelizing one module over another. Below are explained the steps for joint parallelization of the VVC modules that simultaneously allow low branch divergence and yet high data divergence.

Parallel Processing of Temporal Layer Pictures

The decoding framerate as well as the latency can be simultaneously reduced by parallel decoding of the temporal picture layers. For example, a new reference picture occupies a lower temporal layer in comparison to a non-reference picture and vice versa. To process consecutive frames in parallel, the following stage are performed in succession:

Complete the prediction process of the collocated CU, bottom and top right CU in the reference picture.

Start the Inverse re-shaping and De-blocking of the collocated CU in reference picture after the bottom and right CU prediction process is completed.

Apply inverse re-shaping and loop-filtering on the collocated CU in parallel with other CUs prediction process in the reference picture.

Generate the prediction buffer for the current CU.

Parallel Processing of Multiple Decoding Modules in a Picture

To achieve efficient parallelization of multiple decoding modules two factors are considered. They are: High branch divergence and Percentage of total decoding time Based on our profiling analysis, inter CU prediction, loop-filtering stage occupies very high percentage of decoding time. On the other hand, intra CU prediction module had high branch divergence. Sub-stages within and between such modules are decoded in parallel to minimize total decoding time.

I. CUMV Generation and Inter CU Reconstruction

Parallelization between CUMV generation and inter CU reconstruction follows Approach II and uses following steps.

CU MV generation of the entire picture in parallel following WPP dependency after CABAC decoding Inter CU reconstruction for the entire picture in parallel Scheduling inter CU reconstruction of top row CTUs in parallel with CUMV generation of other CTUs After the completion of top CTU rows CU MV generation process, those free worker threads will be assigned to inter CU reconstruction process instead of other CTU rows CU MV generation process. Early allocation of worker threads to below rows CU MV generation process will lead to resource wastage as they have WPP dependency from their top CTU rows. Allocating those worker threads to inter CU reconstruction process will help in utilizing the resources effectively.

Figure 13:
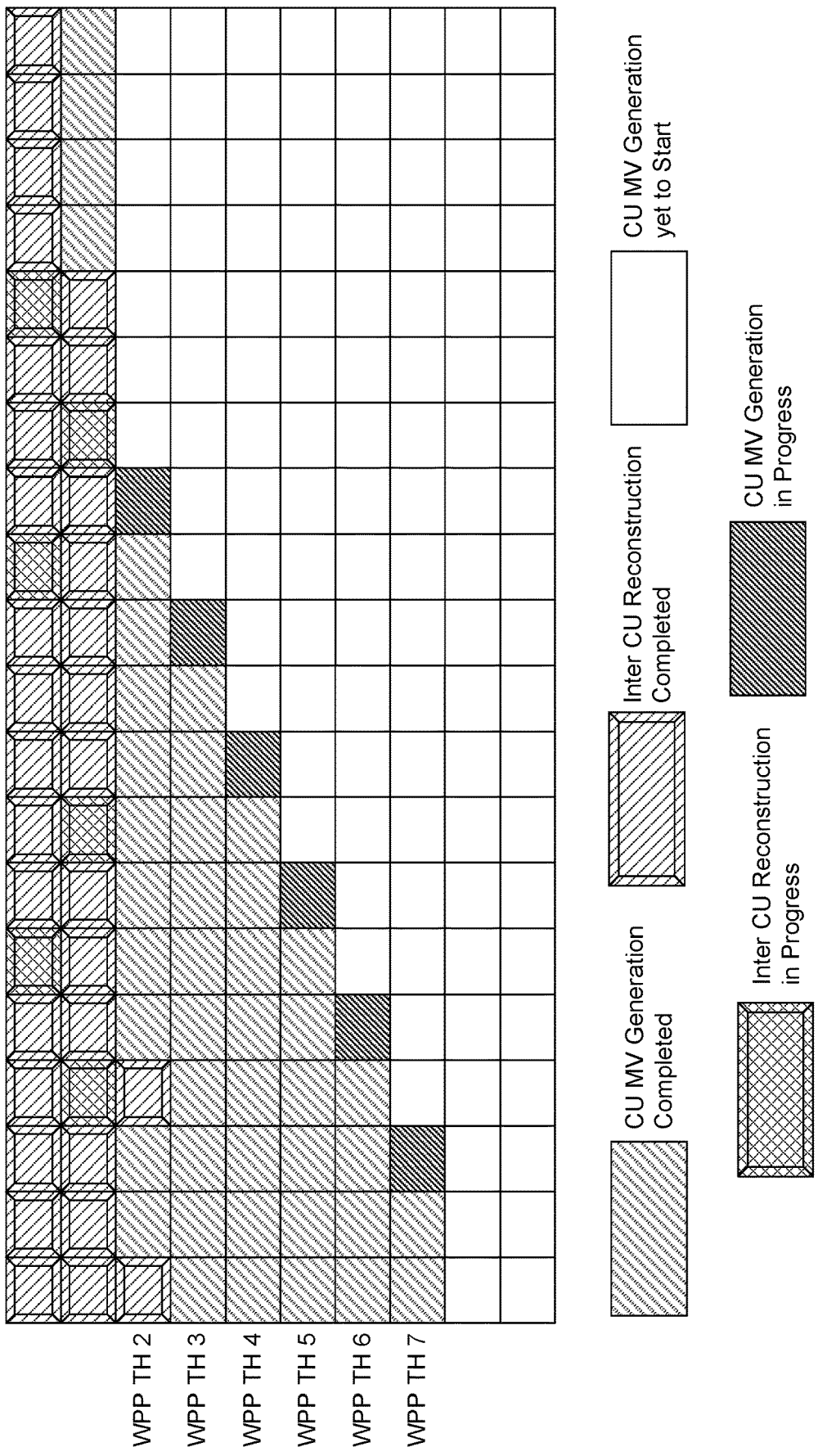
FIG. 13 illustrates interleaved processing of coding unit motion vector generation and inter coding unit reconstruction decoding stages.

As shown in FIG. 13, inter CU reconstruction process of top CTU rows has been started using a number free worker threads while the CU motion vector generation process is executed by WPP worker threads for the lower CTU rows.

II. CUMV Generation, Inter and Intra CU Reconstruction

Figure 11:
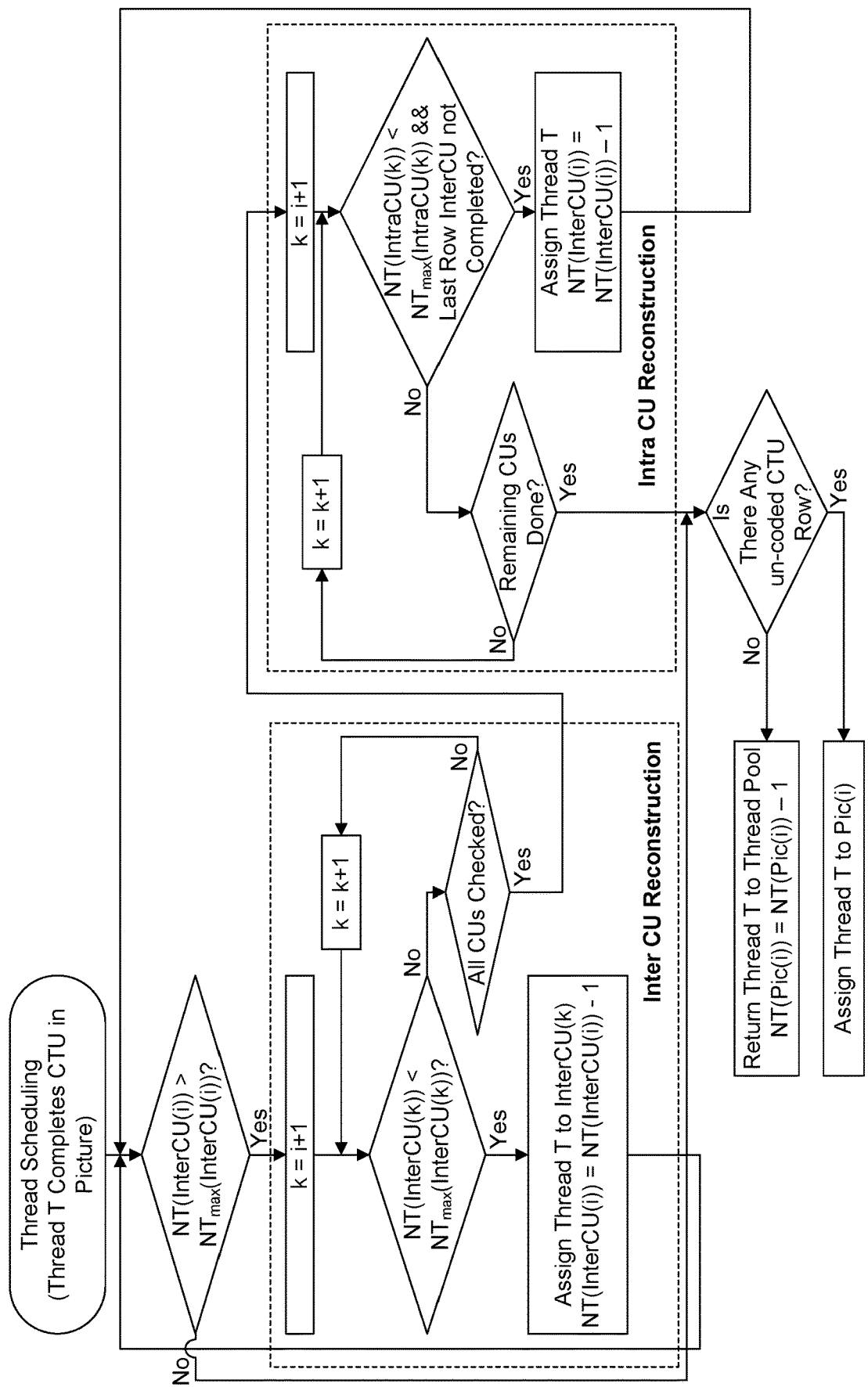
FIG. 11 illustrates joint parallelization of inter coding units and intra coding unit reconstruction decoding stage.

The joint parallelization of the inter CU and the intra CU reconstruction stage is shown in FIG. 11 and associated parameters explained in Table 4. The intra CU reconstruction follows the inter CU reconstruction process. However, top row CTUs intra CU reconstruction process can be executed in parallel with inter CU reconstruction of other CTUs (e.g. last rows CTUs). This would ensure availability of inter CU reconstruction samples while simultaneously benefiting from joint parallelization of inter CU and intra CU reconstruction.

Figure 14:
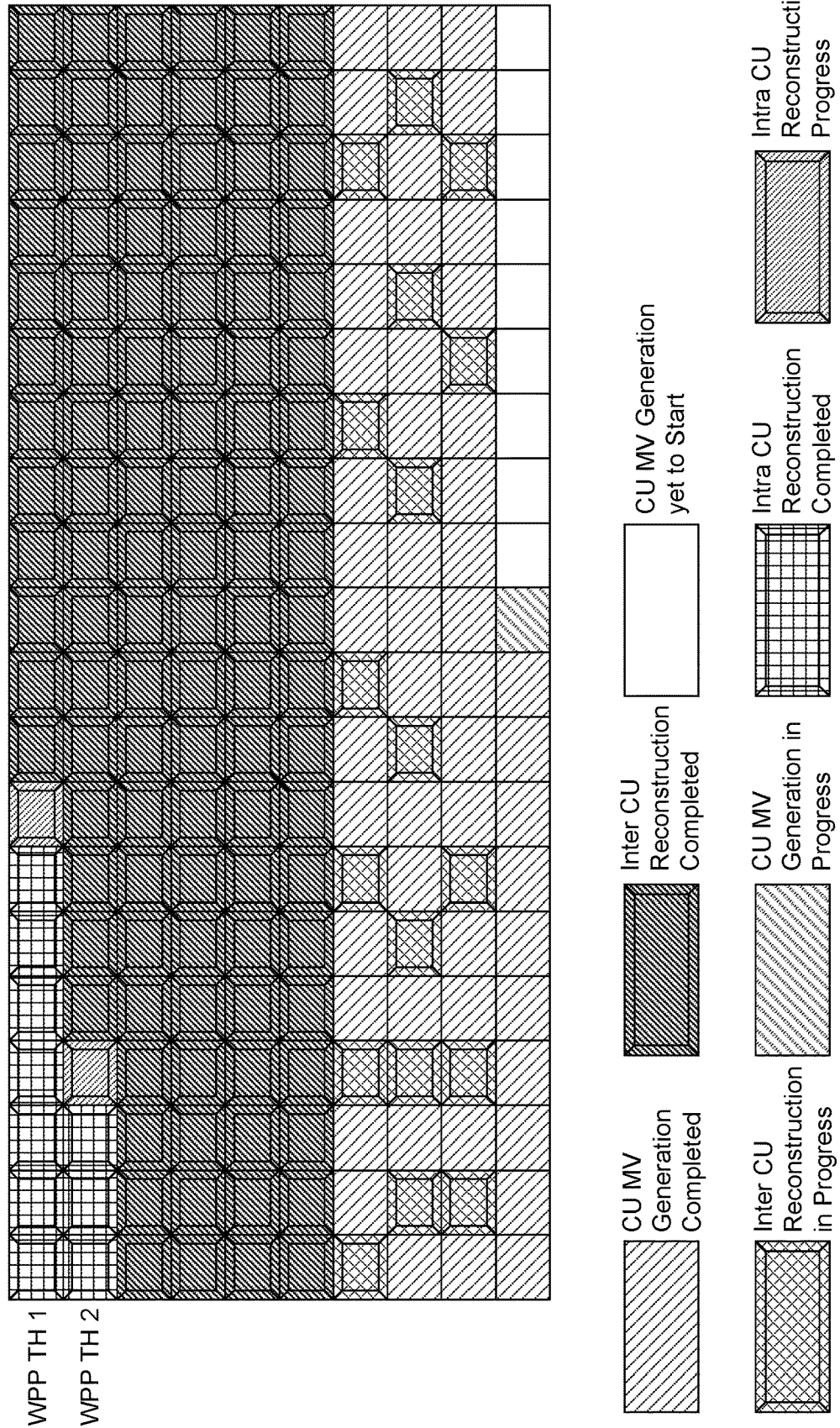
FIG. 14 illustrates interleaved processing of inter and intra coding unit reconstruction decoding stages.

As shown in FIG. 14, motion vector generation, inter and intra CU reconstruction decoding stages can be overlapped. When a WPP thread completed CU MV generation of a particular CTU row, the free worker thread can be used for inter CU reconstruction. Once the inter CU reconstruction of a predefined number of CTUs is completed, a free worker thread can start executing the $1^{st}$ CTU row intra CU reconstruction process. By the time another free worker thread starts executing the $2^{nd}$ CTU row intra CU reconstruction process, many CTUs intra CU reconstruction process in the $1^{st}$ CTU row has been completed. This way, the delay in the $2^{nd}$ CTU row intra CU reconstruction process due to WPP dependency can be minimized significantly.

TABLE 4

Joint inter and intra CU reconstruction Variables definition

| Variables | Definitions |
|---|---|
| InterCU(i) | i-th inter CU reconstruction decoding stage |
| IntraCU(i) | i-th intra CU reconstruction decoding stage |
| $NT_{max}$ | Maximum number of threads for both the modules |
| NT | Number of total threads working on both module |

III. Inverse Re-Shaping and Intra CU Reconstruction

Figure 15:
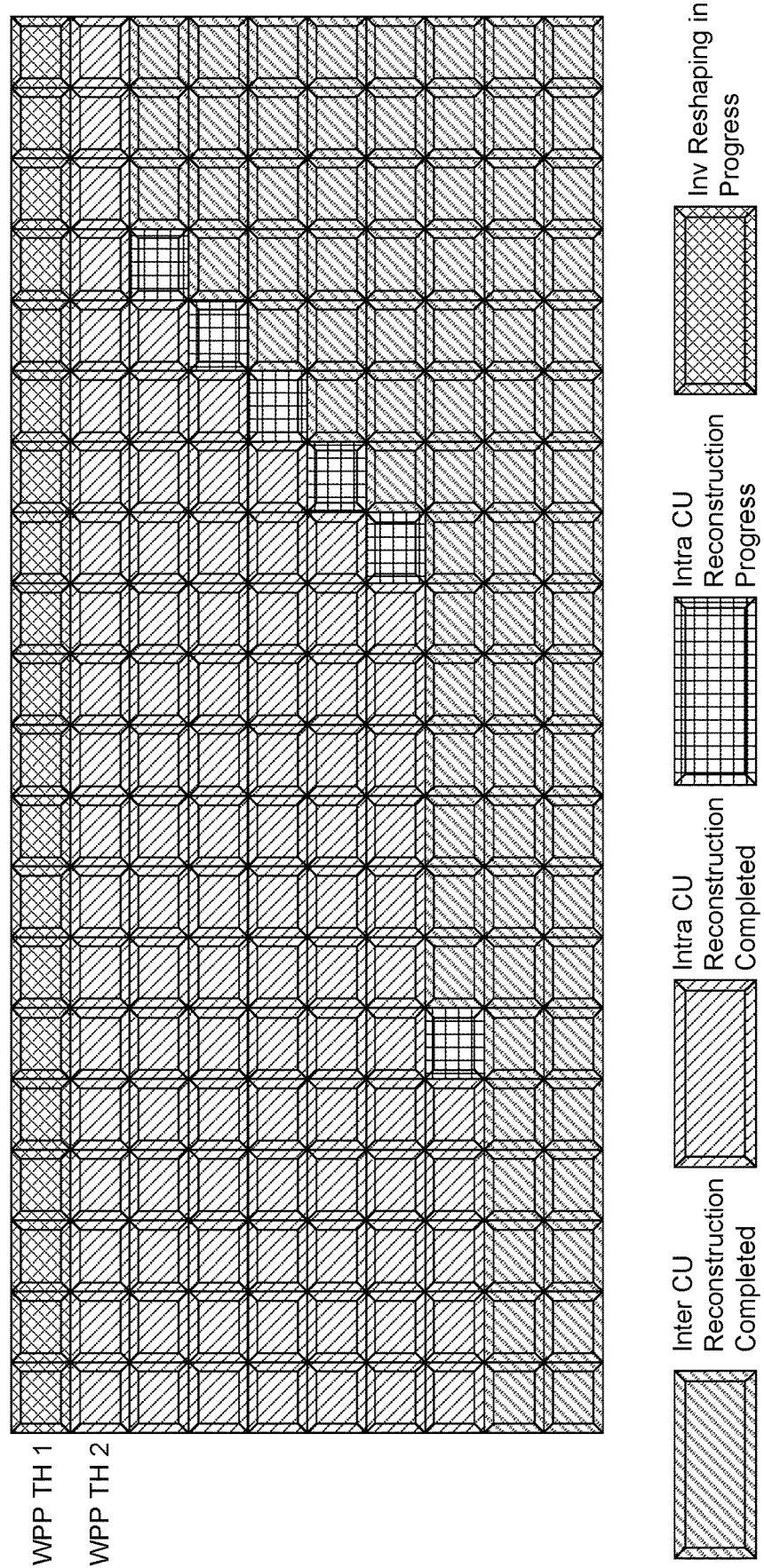
FIG. 15 illustrates interleaved processing of inter, intra coding unit reconstruction and inverse reshaping decoding stages.

CTU level inverse re-shaping process and the inter, intra CU reconstruction of other CTUs are executed in parallel. As shown in FIG. 15, inverse reshaping process for the top CTU rows can be scheduled using a free worker thread before completion of the inter and intra CU reconstruction of entire picture. This early scheduling enables the top row CTUs entire reconstruction process including the De-blocking, SAO and ALF completion before the inter & intra CU reconstruction completion of the entire picture. Once the top CTU rows reconstruction is completed, the next dependent pictures decoding can be started in parallel with the current picture decoding.

Figure 16A:
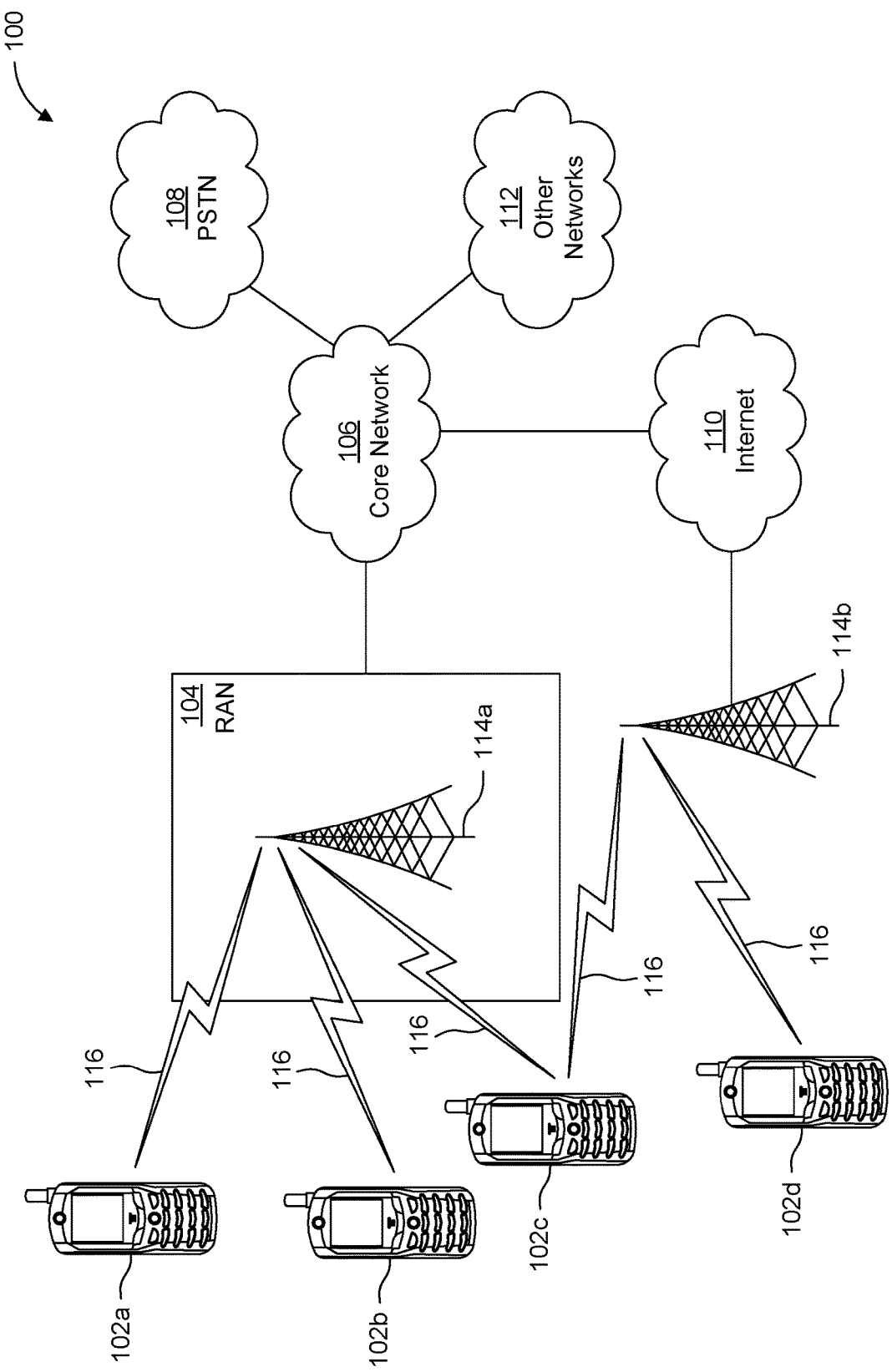
FIGS. 16a and 16b illustrate a) a diagram illustrating an example communications system 100 in which one or more disclosed embodiments may be implemented and, b) a system diagram illustrating an example WTRU.

FIG. 16A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 16A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 16A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 16A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 16A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 16A may be configured to communicate with the base station 114a, which may employ a cellular-based radio technology, and with the base station 114b, which may employ an IEEE 802 radio technology.

Figure 16B:
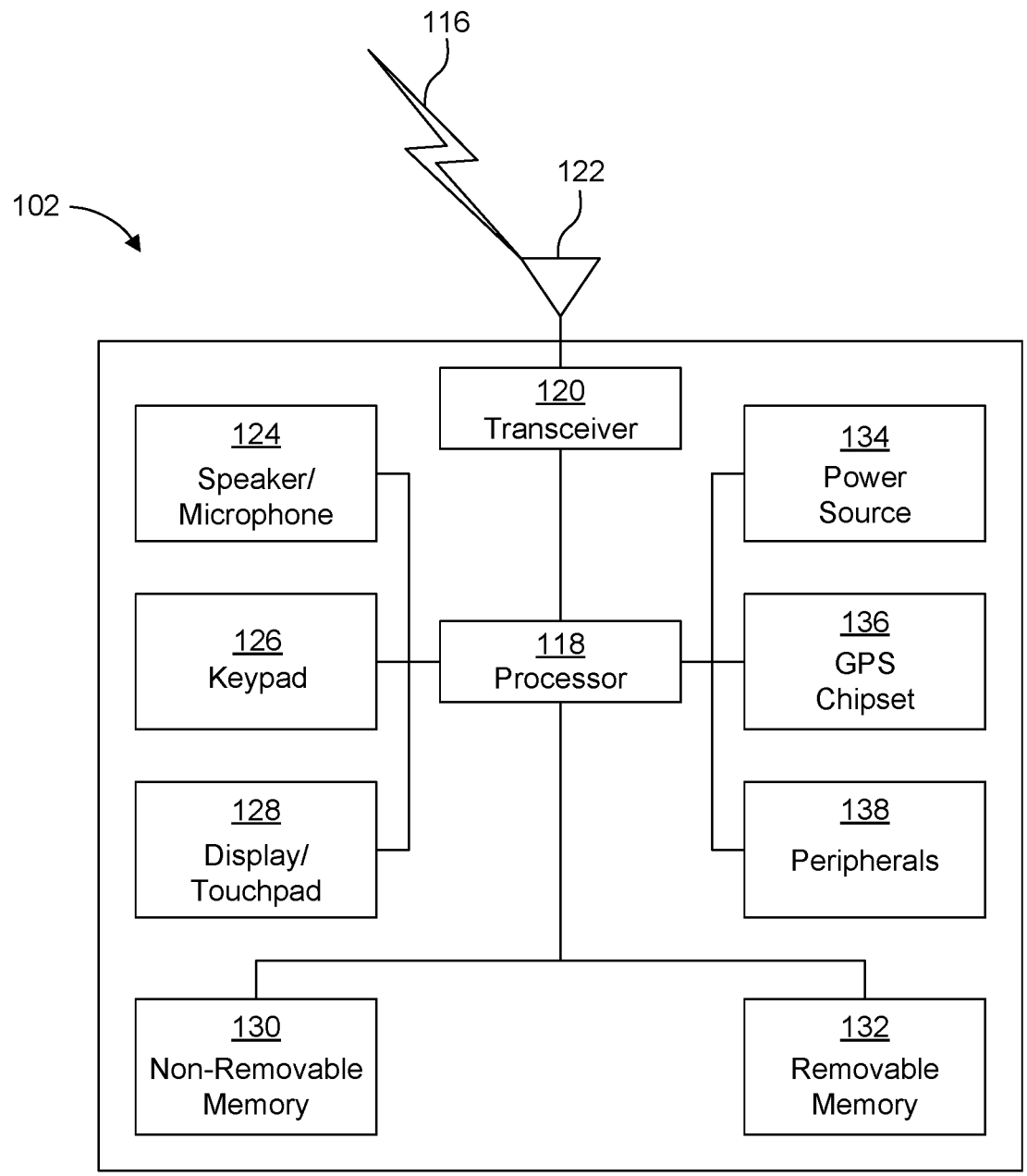

FIG. 16B is a system diagram illustrating an example WTRU 102. As shown in FIG. 16B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 16B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 16B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 16A-16B as a wireless terminal, it is contemplated that in certain representative embodiments that such a terminal may use (e.g., temporarily, or permanently) wired communication interfaces with the communication network.

In view of FIGS. 16A-16B, and the corresponding description of FIGS. 16A-16B, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Like the HEVC Test Model (HM), the Joint Exploration Model (JEM) software is also built upon the block-based hybrid video coding framework (100). FIG. 1 illustrates a block diagram of a block-based hybrid video encoding system. Note that in the present application, the terms "reconstructed" and "decoded" may be used interchangeably. Usually, but not necessarily, the term "reconstructed" is used at the encoder side while "decoded" is used at the decoder side.

Before being encoded, the video sequence may go through pre-processing, for example, applying a color transform to the input color picture (e.g., conversion from RGB 4:4:4 to YCbCr 4:2:0), or performing a remapping of the input picture components in order to get a signal distribution more resilient to compression (e.g., using a histogram equalization of one of the color components). Metadata may be associated with the pre-processing and attached to the bitstream.

The input video signal 102 is processed block by block. The HEVC specification distinguishes between "blocks" and "units," where a "block" addresses a specific area in a sample array (e.g., luma, Y), and the "unit" includes the collocated blocks of all encoded color components (e.g., Y, Cb, Cr, or monochrome), syntax elements, and prediction data that are associated with the blocks (e.g., motion vectors). In the present application, the term "block" can be used to refer to an array of data of various sizes, and it may be used to refer to a macroblock and a partition as specified in H.264/AVC, any of a coding tree unit (CTU), a coding unit (CU), a prediction unit (PU), a transform unit (TU), a coding block (CB), a prediction block (PB), and a transform block (TB) as in HEVC, a superblock or sub-partitioning in AV1, a CTU, CU, TU, CB, and TB as in VVC (Versatile Video Coding) or other video coding standards.

In HEVC, extended block sizes are used to efficiently compress high resolution (1080p and beyond) video signals. In HEVC, a CU can be up to 64×64 pixels. A CU can be further partitioned into prediction units, for which separate prediction methods are applied. For each input video block (MB or CU), spatial prediction (160) and/or temporal prediction (162) may be performed.

Spatial prediction (or "intra prediction") uses pixels from the samples of already-coded neighboring blocks (which are called reference samples) in the same video picture/slice to predict the current video block. Spatial prediction reduces spatial redundancy inherent in the video signal.

Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally; and the reference index is used to identify from which reference picture in the reference picture store (164) the temporal prediction signal comes.

After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106).

The encoder decodes an encoded block to provide a reference for further prediction. The quantized residual coefficients are inverse quantized (110) and inverse transformed (112) to form the reconstructed residual, which is then added back to the prediction block (126) to form the reconstructed video block.

The encoder may also skip the transform and apply quantization directly to the non-transformed residual signal. The encoder may also bypass both transform and quantization, i.e., the residual is coded directly without the application of the transform or quantization process. In direct pulse code modulation (PCM) coding, no prediction is applied and the coding unit samples are directly coded into the bitstream.

Further in-loop filtering such as de-blocking filter, SAO (Sample Adaptive Offset) filter and Adaptive Loop Filters may be applied (166) to the reconstructed video block before it is put in the reference picture store (164) and used to code future video blocks. To form the output video bitstream 120, coding mode (inter or intra), prediction mode information, motion information, and quantized residual coefficients are all sent to the entropy coding unit (108) to be further compressed and packed to form the bitstream.

FIG. 3 illustrates a general block diagram of a block-based video decoder (200). A video decoder generally performs a decoding pass reciprocal to the corresponding encoding pass, which performs video decoding as part of encoding video data. The video bitstream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering (266) before it is stored in reference picture store 264. The reconstructed video (220) in the reference picture store may then be stored, transmitted or used to drive a display device, as well as used to predict future video blocks.

The decoded picture may further go through post-processing, for example, an inverse color transform (e.g., conversion from YCbCr 4:2:0 to RGB 4:4:4) or an inverse remapping performing the inverse of the remapping process performed in the pre-encoding processing. The post-processing may use metadata derived in the pre-encoding processing and signaled in the bitstream.

Both HEVC and the JEM adhere to the block-based motion compensated hybrid video encoding/decoding workflows as shown in FIG. 1 and FIG. 3 and are based on the same functional modules such as spatial prediction (i.e., intra prediction), temporal prediction (i.e., inter prediction), transform, quantization, entropy coding and loop filters. However, several inter coding modules, especially the ones associated with motion compensated prediction, are further extended, and improved.

Figure 17:
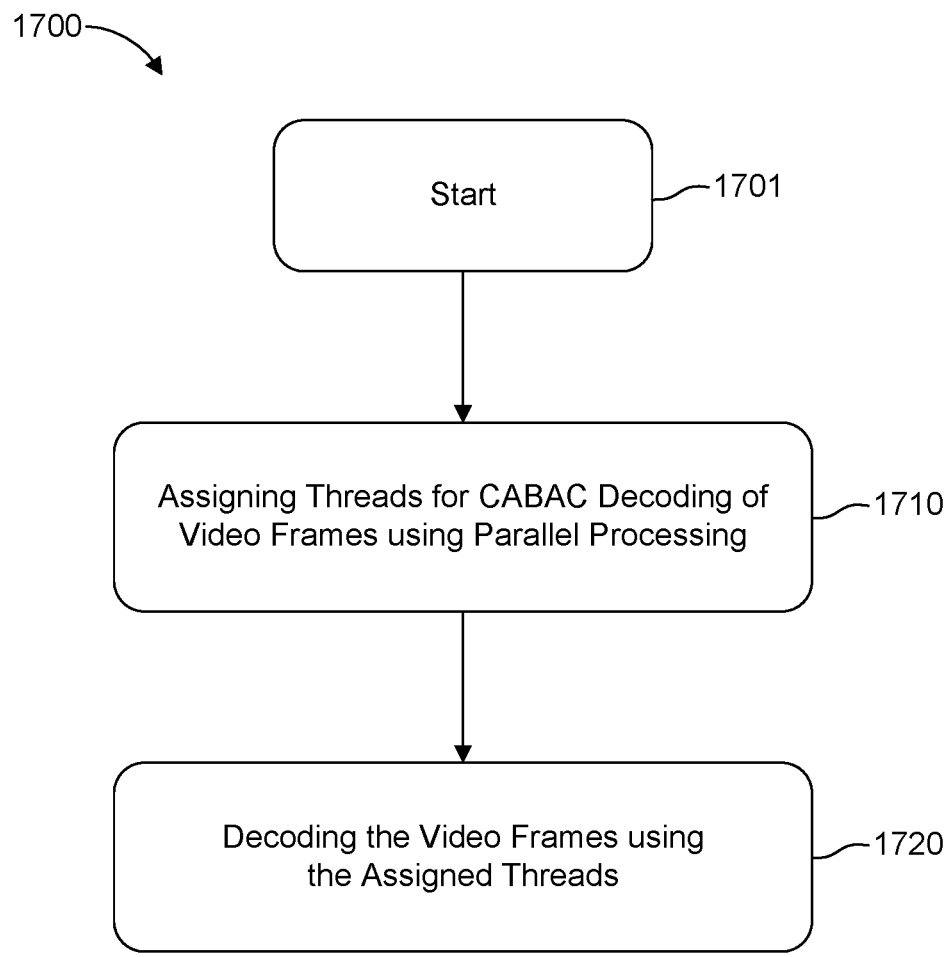
FIG. 17 illustrates one embodiment of a method under the general aspects described.

One embodiment of a method 1700 under the general aspects described here is shown in FIG. 17. The method commences at start block 1701 and control proceeds to block 1710 assigning threads for CABAC decoding of video frames using parallel processing, wherein a higher number of threads are assigned for decoding of frames with a low quantization parameter compared to a higher quantization parameter, or an intra frame relative to an inter frame, or for P frames, or when the frame is in a lower temporal layer. Control proceeds from block 1710 to block 1720 for decoding the video frames using the assigned threads.

Figure 18:
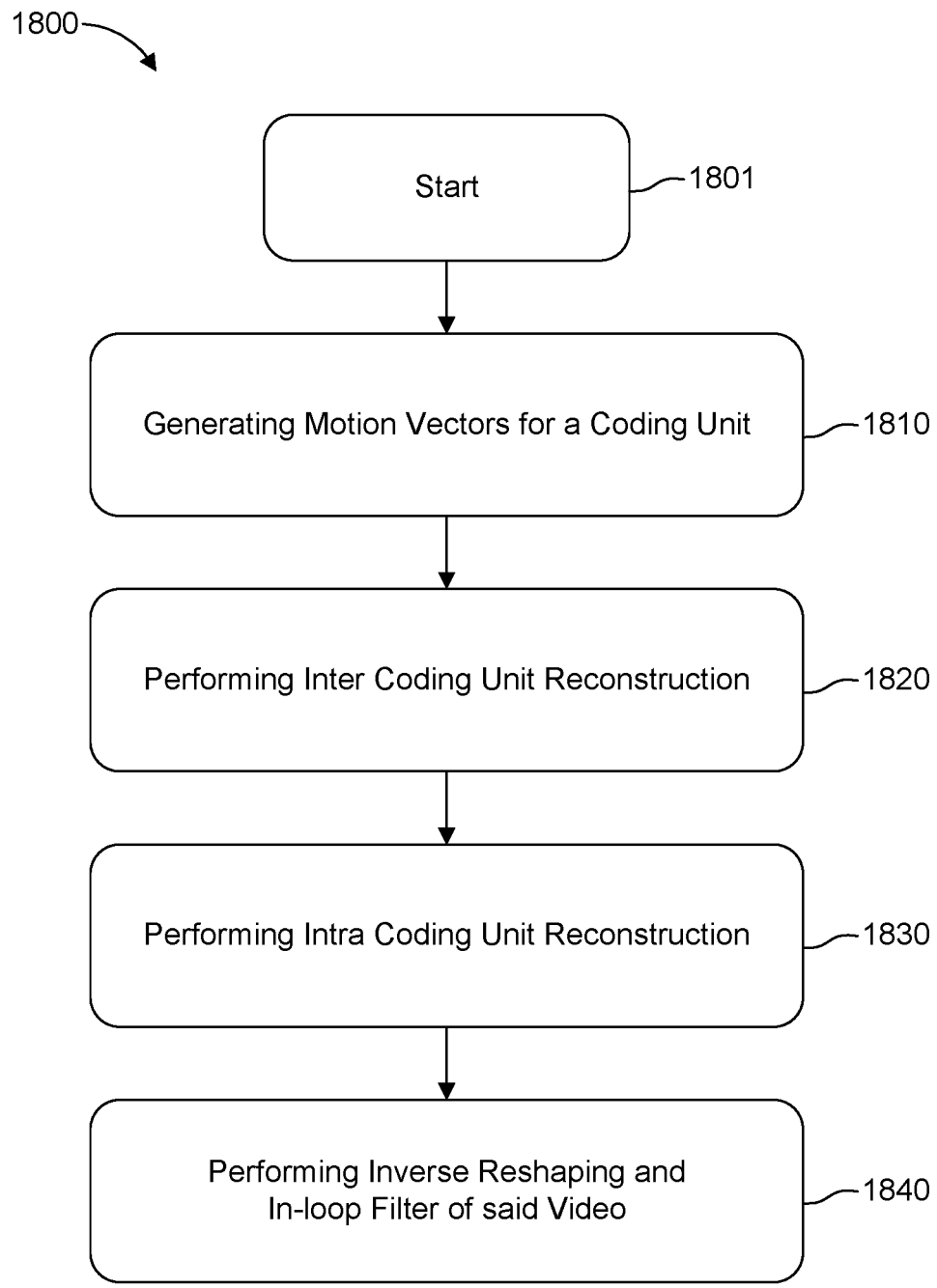
FIG. 18 illustrates a second embodiment of a method under the general aspects described.

A second embodiment of a method 1800 under the general aspects described here is shown in FIG. 18. The method commences at start block 1801 and control proceeds to block 1810 for generating motion vectors for a coding unit. Control proceeds from block 1810 to block 1820 for performing inter coding unit reconstruction. Control proceeds from block 1820 to block 1830 for performing intra coding unit reconstruction. Control proceeds from block 1830 to block 1840 for performing inverse reshaping and in-loop filter of said video, wherein said generating and performing steps are performed concurrently on distinct portions of the video.

Figure 19:
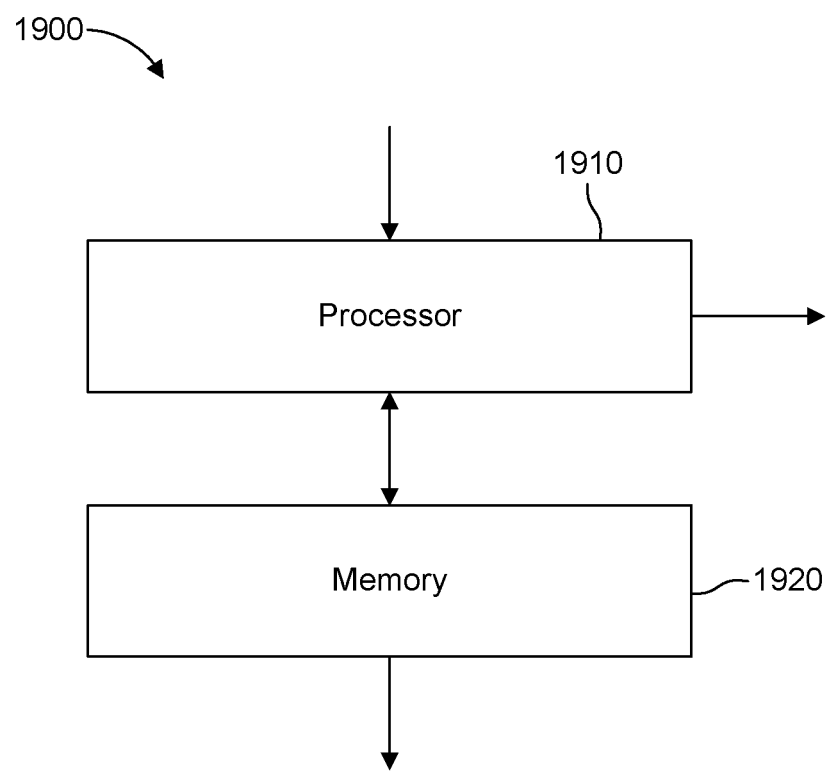
FIG. 19 illustrates an apparatus for performing any of the described methods.

FIG. 19 shows one embodiment of an apparatus 1900 implementing the methods of FIG. 17 or FIG. 18. The apparatus comprises Processor 1910 and can be interconnected to a memory 1920 through at least one port. Both Processor 1910 and memory 1920 can also have one or more additional interconnections to external connections.

Processor 1910 is also configured to either insert or receive information in a bitstream and, either compressing, encoding, or decoding using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding sections describe a number of embodiments, across various claim categories and types. Features of these embodiments can be provided alone or in any combination. Further, embodiments can include one or more of the following features, devices, or aspects, alone or in any combination, across various claim categories and types:

Generating a decoded video stream wherein assigning threads for CABAC decoding of video frames using parallel processing, The above method wherein a higher number of threads are assigned for decoding of frames with a low quantization parameter compared to a higher quantization parameter, or an intra frame relative to an inter frame, or for P frames, or when the frame is in a lower temporal layer, Decoding the above video frames using said assigned threads

The invention claimed is:

1. A method of parallel decoding of video, comprising:
generating motion vectors for a coding unit;
performing inter coding unit reconstruction;
performing intra coding unit reconstruction; and
performing inverse reshaping and in-loop filter of said video,
wherein said generating and performing steps are performed concurrently on distinct portions of the video, wherein decoder motion vector refinement is used when a length of a motion vector is less than a threshold.

2. The method of claim 1, wherein motion vector generation is based on a left, top and/or top right neighboring coding unit.

3. The method of claim 1, wherein generation of motion vectors for a top right coding tree unit completes before proceeding to a current coding tree unit motion vector generation.

4. The method of claim 1, wherein inter coded coding unit reconstruction is performed separately from intra mode and combined inter and intra prediction mode reconstruction.

5. The method of claim 1, wherein a coding unit reconstruction is performed over one or more portions of the coding unit in parallel.

6. The method of claim 1, wherein decoder motion vector refinement is used when a length of a motion vector is less than a threshold.

7. A device, comprising:
memory; and, one or more processors, configured to
generate motion vectors for a coding unit;
perform inter coding unit reconstruction;
perform intra coding unit reconstruction; and
perform inverse reshaping and in-loop filter of said video,
wherein the device is configured to said generate and perform concurrently on distinct portions of the video, wherein decoder motion vector refinement is used when a length of a motion vector is less than a threshold.

8. A non-transitory computer readable medium containing data content decoded according to the method of claim 1, for playback using a processor.

9. A computer program product comprising instructions which, when the program is executed by a computer, cause the computer to carry out the method of claim 1.

\* \* \* \* \*